(12) United States Patent
Bae et al.

(10) Patent No.: US 11,036,104 B2
(45) Date of Patent: Jun. 15, 2021

(54) LIQUID CRYSTAL DISPLAY

(71) Applicant: Samsung Display Co. Ltd., Yongin-si (KR)

(72) Inventors: Kwang Soo Bae, Yongin-si (KR); Jung Suk Bang, Hwaseong-si (KR); Min Jeong Oh, Gimpo-si (KR); Bo Ram Lee, Seongnam-si (KR); Young Je Cho, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 81 days.

(21) Appl. No.: 16/172,868

(22) Filed: Oct. 29, 2018

(65) Prior Publication Data
US 2019/0324335 A1    Oct. 24, 2019

(30) Foreign Application Priority Data

Apr. 20, 2018   (KR) .................. 10-2018-0046286

(51) Int. Cl.
*G02F 1/1362*    (2006.01)
*G02F 1/1335*    (2006.01)
(Continued)

(52) U.S. Cl.
CPC .. *G02F 1/136286* (2013.01); *G02F 1/133512* (2013.01); *G02F 1/133514* (2013.01);
(Continued)

(58) Field of Classification Search
CPC ......... G02F 1/136286; G02F 1/133512; G02F 1/133514; G02F 1/134309;
(Continued)

(56) References Cited

U.S. PATENT DOCUMENTS

2009/0316102 A1* 12/2009 Cho .................. G02F 1/134309
349/144
2014/0098317 A1* 4/2014 Jung ................. G02F 1/134336
349/43
(Continued)

FOREIGN PATENT DOCUMENTS

EP    3486715    5/2019

OTHER PUBLICATIONS

Extended European Search Report dated Jul. 18, 2019, issued in European Patent Application No. 19155896.4.

*Primary Examiner* — Charles S Chang
(74) *Attorney, Agent, or Firm* — H.C. Park & Associates, PLC

(57) ABSTRACT

A liquid crystal display (LCD) including a first pixel electrode including a first stem portion extending in a first direction, a second stem portion connected to a side of the first stem portion and extending in a second direction different from the first direction, and a third stem portion connected to the other side of the first stem portion and extending in the second direction; a first data line extending in the second direction and overlapping the second stem portion of the first pixel electrode; and a second data line extending in the second direction and overlapping the third stem portion of the first pixel electrode. The second stem portion includes a first sub-stem portion and a second sub-stem portion having different widths, and the third stem portion includes a third sub-stem portion and a fourth sub-stem portion having different widths.

20 Claims, 21 Drawing Sheets

(51) Int. Cl.
*G02F 1/1343* (2006.01)
*G09G 3/36* (2006.01)

(52) U.S. Cl.
CPC ..... *G02F 1/134309* (2013.01); *G09G 3/3677* (2013.01); *G09G 3/3688* (2013.01); *G02F 2201/123* (2013.01); *G09G 2300/0426* (2013.01); *G09G 2310/08* (2013.01)

(58) Field of Classification Search
CPC ............ G02F 2201/123; G09G 3/3688; G09G 3/3677; G09G 2300/0426; G09G 2310/08
USPC .................................................. 349/141–146
See application file for complete search history.

(56) References Cited

U.S. PATENT DOCUMENTS

| | | |
|---|---|---|
| 2017/0153517 A1* | 6/2017 | Shin .................. G02F 1/134336 |
| 2017/0242306 A1 | 8/2017 | Chang et al. |
| 2017/0322469 A1 | 11/2017 | Shin et al. |
| 2017/0357129 A1 | 12/2017 | Chang et al. |
| 2018/0107040 A1* | 4/2018 | Yeh ....................... G02F 1/1368 |
| 2019/0146284 A1 | 5/2019 | Bae et al. |
| 2019/0296048 A1* | 9/2019 | Lee ................... G02F 1/134309 |

* cited by examiner

LIQUID CRYSTAL DISPLAY

CROSS REFERENCE TO RELATED APPLICATION

This application claims priority from and the benefit of Korean Patent Application No. 10-2018-0046286, filed on Apr. 20, 2018, which is hereby incorporated by reference for all purposes as if fully set forth herein.

BACKGROUND

Field

Exemplary embodiments/implementations of the invention relate generally to a liquid crystal display.

Discussion of the Background

With the development of multimedia, display devices are becoming increasingly important. Accordingly, various types of display devices, such as liquid crystal displays (LCDs) and organic light emitting displays (OLEDs), are being used.

LCDs are one of the most widely used types of flat panel displays. An LCD includes a pair of substrates having field generating electrodes, such as pixel electrodes and a common electrode, and a liquid crystal layer inserted between the two substrates. In an LCD, voltages are applied to the field generating electrodes to generate an electric field in the liquid crystal layer. Accordingly, the alignment of liquid crystal molecules in the liquid crystal layer is determined, and the polarization of incident light is controlled. As a result, a desired image is displayed on the LCD.

The above information disclosed in this Background section is only for understanding of the background of the inventive concepts, and, therefore, it may contain information that does not constitute prior art.

SUMMARY

Exemplary embodiments of the present invention provide a liquid crystal display (LCD) capable of performing high-resolution driving and having a low aperture ratio loss.

Exemplary embodiments of the present invention also provide an LCD capable of controlling a plurality of liquid crystal molecules disposed between adjacent pixel electrodes without a trench.

Additional features of the inventive concepts will be set forth in the description which follows, and in part will be apparent from the description, or may be learned by practice of the inventive concepts.

An exemplary embodiment of the present invention provides an LCD including a first pixel electrode which includes a first stem portion extending in a first direction, a second stem portion connected to a side of the first stem portion and extending in a second direction different from the first direction, and a third stem portion connected to the other side of the first stem portion and extending in the second direction; a first data line which extends in the second direction and overlaps the second stem portion of the first pixel electrode; and a second data line which extends in the second direction and overlaps the third stem portion of the first pixel electrode. The second stem portion includes a first sub-stem portion and a second sub-stem portion having different widths, and the third stem portion includes a third sub-stem portion and a fourth sub-stem portion having different widths.

Another exemplary embodiment of the present invention provides an LCD including a substrate; a first scan line which is disposed on the substrate and extends in a first direction; a first data line which is disposed on the first scan line and extends in a second direction different from the first direction; a second data line which is disposed on the same layer as the first data line and extends in the second direction; a first pixel electrode which is disposed on the first data line and the second data line and comprises a first stem portion extending in the first direction, a second stem portion extending in the second direction and overlapping the first data line and a third stem portion extending in the second direction and overlapping the second data line; and a first switching element which includes a control electrode connected to the first scan line, an electrode connected to the first data line, and the other electrode connected to the first pixel electrode. The second stem portion includes a first sub-stem portion and a second sub-stem portion having different widths, and the third stem portion includes a third sub-stem portion and a fourth sub-stem portion having different widths.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
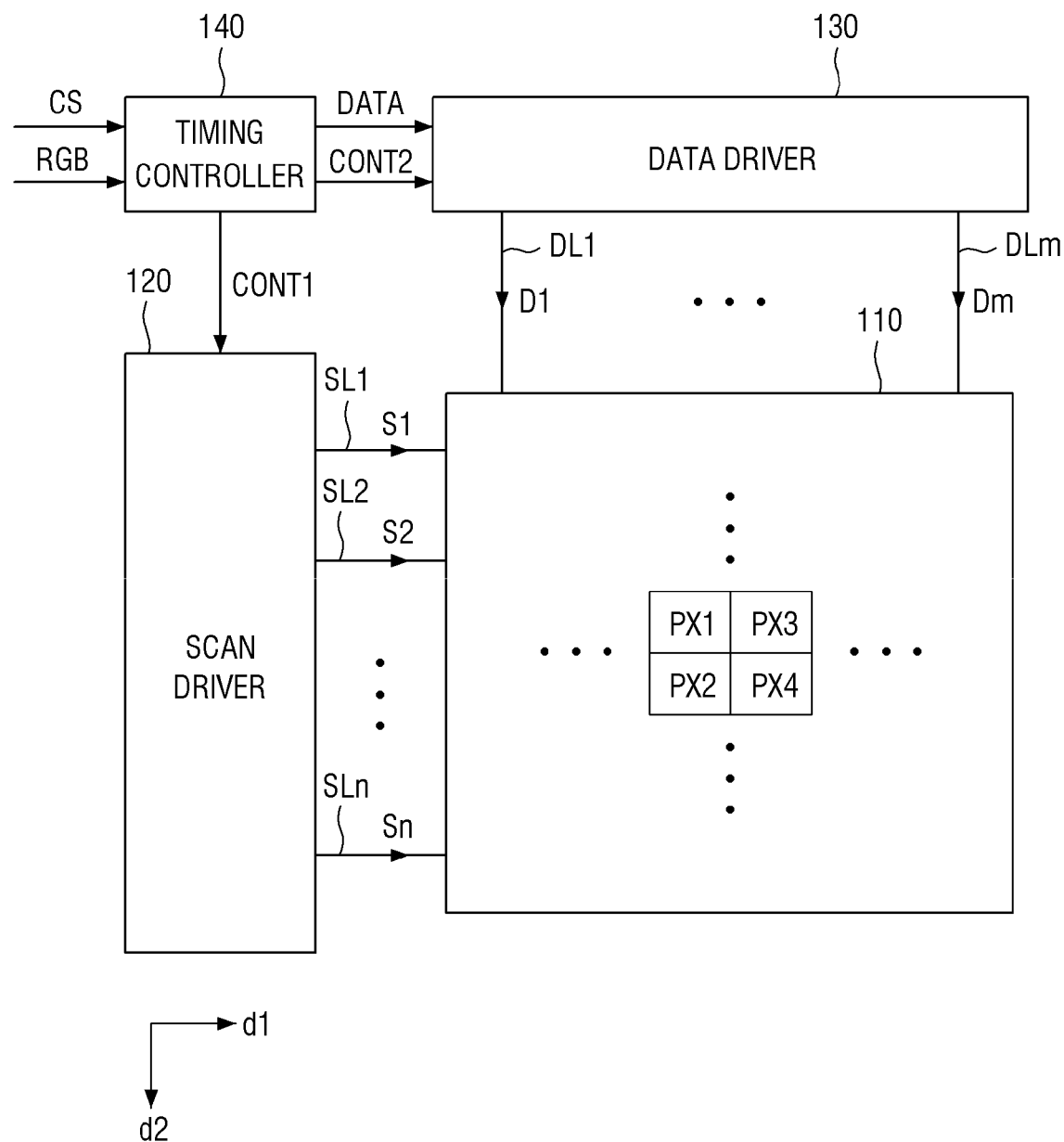
FIG. 1 is a schematic block diagram of a liquid crystal display (LCD) according to an exemplary embodiment.

In the following description, for the purposes of explanation, numerous specific details are set forth in order to provide a thorough understanding of various exemplary embodiments of the invention. As used herein "embodiments" are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

FIG. 1 is a schematic block diagram of a liquid crystal display (LCD) according to an exemplary embodiment.

Referring to FIG. 1, the LCD may include a display unit 110, a scan driver 120, a data driver 130, and a timing controller 140.

The display unit 110 is defined as an area for displaying an image. A plurality of pixels including first through fourth pixels PX1 through PX4 may be arranged in the display unit 100. Each of the pixels may receive a scan signal from one of first through $n^{th}$ scan lines SL1 through SLn, where n is a natural number of 2 or more. In addition, each of the pixels may receive a data signal from one of first through $m^{th}$ data lines DL1 through DLm, where m is a natural number of 2 or more. Here, the first through $n^{th}$ scan lines SL1 through SLn may extend in a first direction d1. In addition, the first through $m^{th}$ data lines DL1 through DLm may extend in a second direction d2. The first direction d1 may intersect the second direction d2 in an exemplary embodiment. In FIG. 1, the first direction d1 is a row direction, and the second direction d2 is a column direction. Two adjacent ones of the first through $n^{th}$ scan lines SL1 through SLn may be electrically connected to each other. For example, the first scan line SL1 may be electrically connected to the second scan line SL2 adjacent to the first scan line SL1. This will be described in more detail with reference to FIG. 2.

The scan driver 120 may generate first through $n^{th}$ scan signals S1 through Sn based on a first control signal CONT1 received from the timing controller 140. The scan driver 120 may provide the generated first through $n^{th}$ scan signals S1 through Sn to the pixels of the display unit 110 through the first through $n^{th}$ scan lines SL1 through SLn. The scan driver 120 may consist of a plurality of switching elements in an exemplary embodiment or may be an integrated circuit in an exemplary embodiment.

The data driver 130 may receive a second control signal CONT2 and image data DATA from the timing controller 140. The data driver 130 may generate first through $m^{th}$ data signals D1 through Dm based on the second control signal CONT2 and the image data DATA. The data driver 130 may provide the generated first through $m^{th}$ data signals D1 through Dm to the pixels of the display unit 110 through the first through $m^{th}$ data lines DL1 through DLm. The data driver 130 may be a driver integrated circuit in an exemplary embodiment, and the driver integrated circuit may include a shift register, a latch, and a digital-analog converter.

The timing controller 140 may receive an image signal RGB and a control signal CS from an external source. The timing controller 140 may process the image signal RGB and the control signal CS according to the operating conditions of the display unit 110 and then generate the image data DATA, the first control signal CONT1 and the second control signal CONT2.

The image signal RGB may include a plurality of gray data to be provided to the pixel unit 110. In addition, the control signal CS may include a horizontal synchronization signal, a vertical synchronization signal, and a main clock signal in an embodiment. The horizontal synchronization signal indicates the time taken to display one line of the display unit 110. The vertical synchronization signal indicates the time taken to display an image of one frame. The main clock signal is a signal used by the timing controller 140 as a reference for generating various signals in synchronization with the scan driver 120 and the data driver 130.

The pixels arranged in the display unit 110 will now be described in more detail based on the first through fourth pixels PX1 through PX4.

Figure 2:
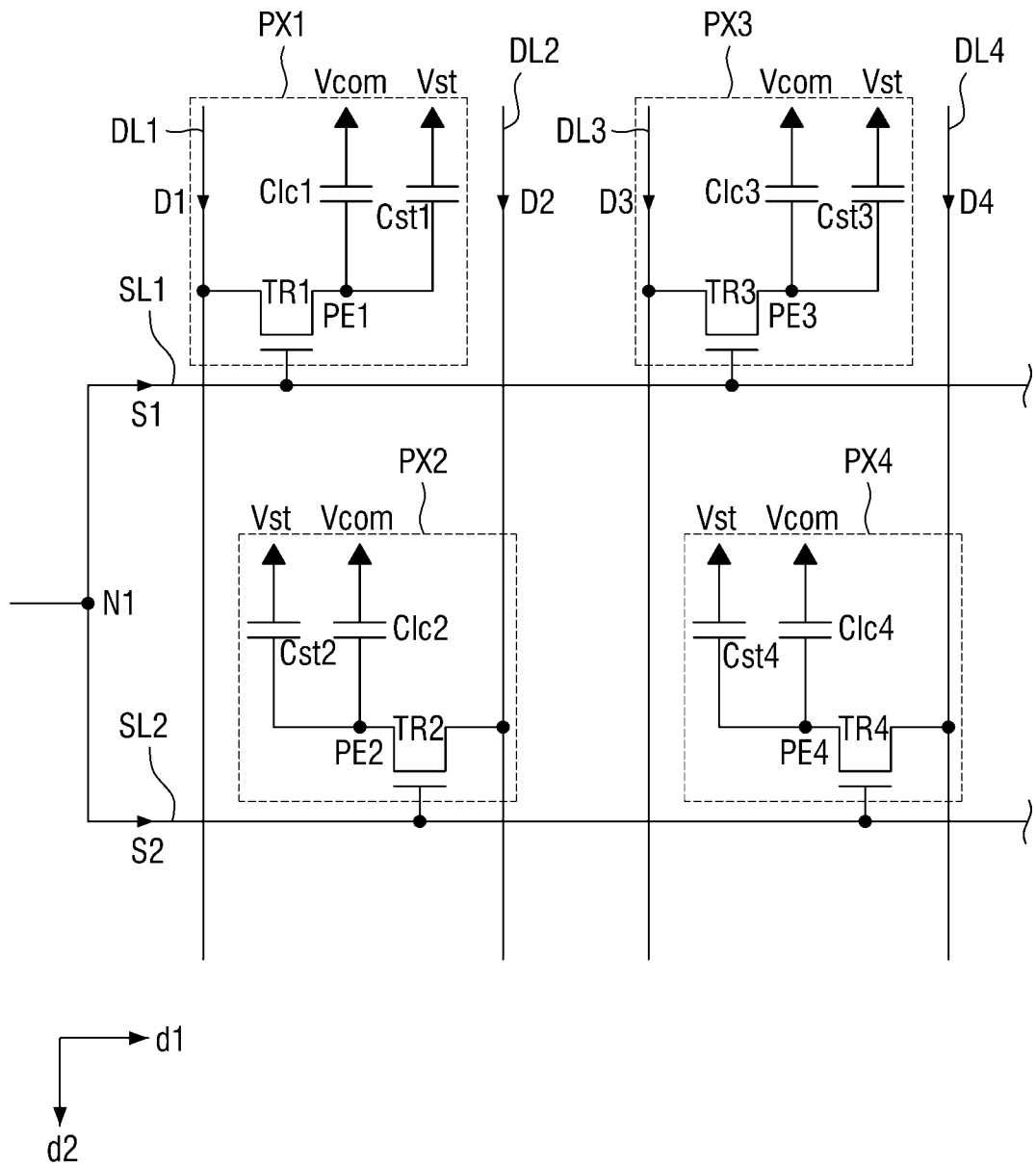
FIG. 2 is an equivalent circuit diagram of first through fourth pixels illustrated in FIG. 1.
Figure 3:
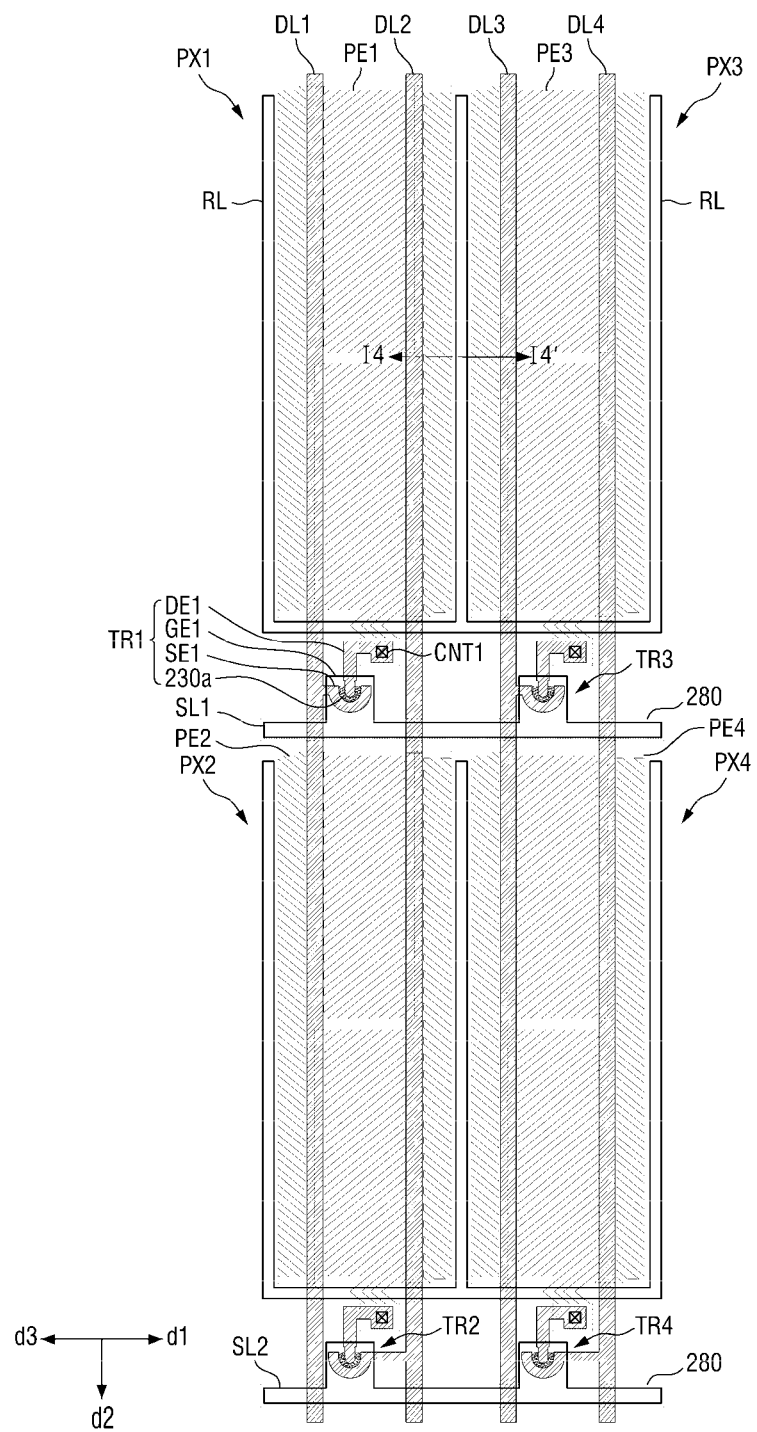
FIG. 3 is a layout view of the first through fourth pixels illustrated in FIG. 1.
Figure 4:
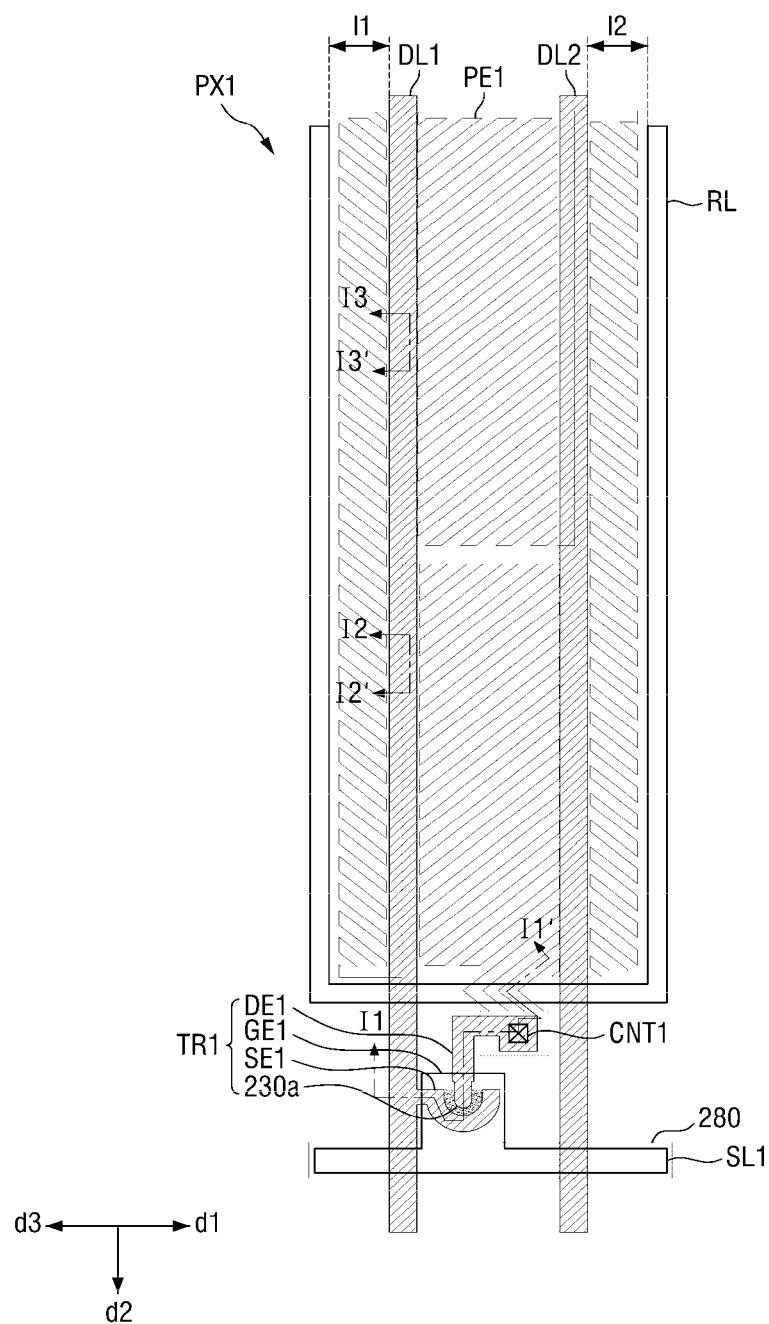
FIG. 4 illustrates the first pixel of FIG. 3 in more detail.

FIG. 2 is an equivalent circuit diagram of the first through fourth pixels PX1 through PX4 illustrated in FIG. 1. FIG. 3 is a layout view of the first through fourth pixels PX1 through PX4 illustrated in FIG. 1. FIG. 4 illustrates the first pixel PX1 of FIG. 3 in more detail.

Referring to FIGS. 2 through 4, the first pixel PX1 may be disposed adjacent to the second pixel PX2 along the second direction d2 and may be disposed adjacent to the third pixel PX3 along the first direction d1. The first through fourth pixels PX1 through PX4 may receive different data signals from different data lines, i.e., the first through fourth data lines DL1 through DL4, respectively.

Pixels disposed in the same row may receive the same scan signal from the same scan line. For example, the first pixel PX1 and the third pixel PX3 may receive the first scan signal S1 from the first scan line SL1, and the second pixel PX2 and the fourth pixel PX4 may receive the second scan signal S2 from the second scan line SL2. Here, the first scan line SL1 and the second scan line SL2 are electrically connected to each other by a first node N1. That is, the first scan signal S1 provided from the first scan line SL1 and the second scan signal S2 provided from the second scan line SL2 may be the same signal. The position of the first node N1 is not particularly limited. In an exemplary embodiment, the first node N1 may be disposed in a non-display area where an image is not displayed. The first scan line SL1 and the second scan line SL2 are not electrically connected only to the first node N1. That is, the first scan line SL1 and the second scan line SL2 can be connected to a plurality of nodes, and at least one of the nodes may be disposed in a display area where an image is displayed.

Each of the first through fourth pixels PX1 through PX4 may include a switching element, a pixel electrode, a liquid crystal capacitor, and a storage capacitor. This will now be described in more detail based on the first pixel PX1.

The first pixel PX1 may include a first switching element TR1, a first pixel electrode PE1, a first liquid crystal capacitor Clc1, and a first storage capacitor Cst1.

The first switching element TR1 may be a thin-film transistor having an input electrode, an output electrode, and a control electrode in an embodiment. The input electrode will hereinafter be referred to as a source electrode, the output electrode as a drain electrode, and the control electrode as a gate electrode.

The first switching element TR1 may include a first gate electrode GE1 electrically connected to the first scan line SL1, a first source electrode SE1 electrically connected to the first data line DL1, and a first drain electrode DE1 electrically connected to the first pixel electrode PE1. Here, the first drain electrode DE1 of the first switching element TR1 may be electrically connected to the first pixel electrode PE1 through a first contact hole CNT1. The first switching element TR1 may perform a switching operation based on the first scan signal S1 received from the first scan line SL1 so as to provide the first data signal D1 received from the first data line DL1 to the first pixel electrode PE1.

The first liquid crystal capacitor Clc1 is formed between the first pixel electrode PE1 and a common electrode CE (see FIG. 8) provided with a common voltage Vcom. The first storage capacitor Cst1 is formed between the first pixel electrode PE1 and a storage line RL provided with a storage voltage Vst. The shape of the first pixel electrode PE1 and the relationship of the first pixel electrode PE1 with other elements will be described later.

The driving of the LCD according to this exemplary embodiment will now be described based on the first pixel PX1 and the second pixel PX2.

The first switching element TR1 performs a switching operation based on the first scan signal S1. In addition, the second switching element TR2 performs a switching operation based on the second scan signal S2. As described above, the first scan line SL1 and the second scan line SL2 are electrically connected to each other. That is, the first scan signal S1 and the second scan signal S2 are substantially the same signal.

Accordingly, the first switching element TR1 and the second switching element TR2 perform the same switching operation. However, since the first switching element TR1 is electrically connected to the first data line DL1 while the second switching element TR2 is electrically connected to the second data line DL2, different data signals may be provided to the first pixel electrode PE1 and the second pixel electrode PE2, respectively. Therefore, the first pixel electrode PE1 and the second pixel electrode PE2 may receive different data signals at the same time.

That is, since the time required for a scan signal to be sequentially provided to the first through $n^{th}$ scan lines SL1 through SLn can be reduced to half, a gate delay can be reduced. In addition, the LCD according to this exemplary embodiment can be applied to a high-resolution product that requires high-frequency driving.

The elements of the LCD according to the embodiment and the arrangement relationship between the elements will now be described with reference to FIGS. 4 through 9B. For ease of description, the following description will be made based on the first pixel PX1.

Figure 5:
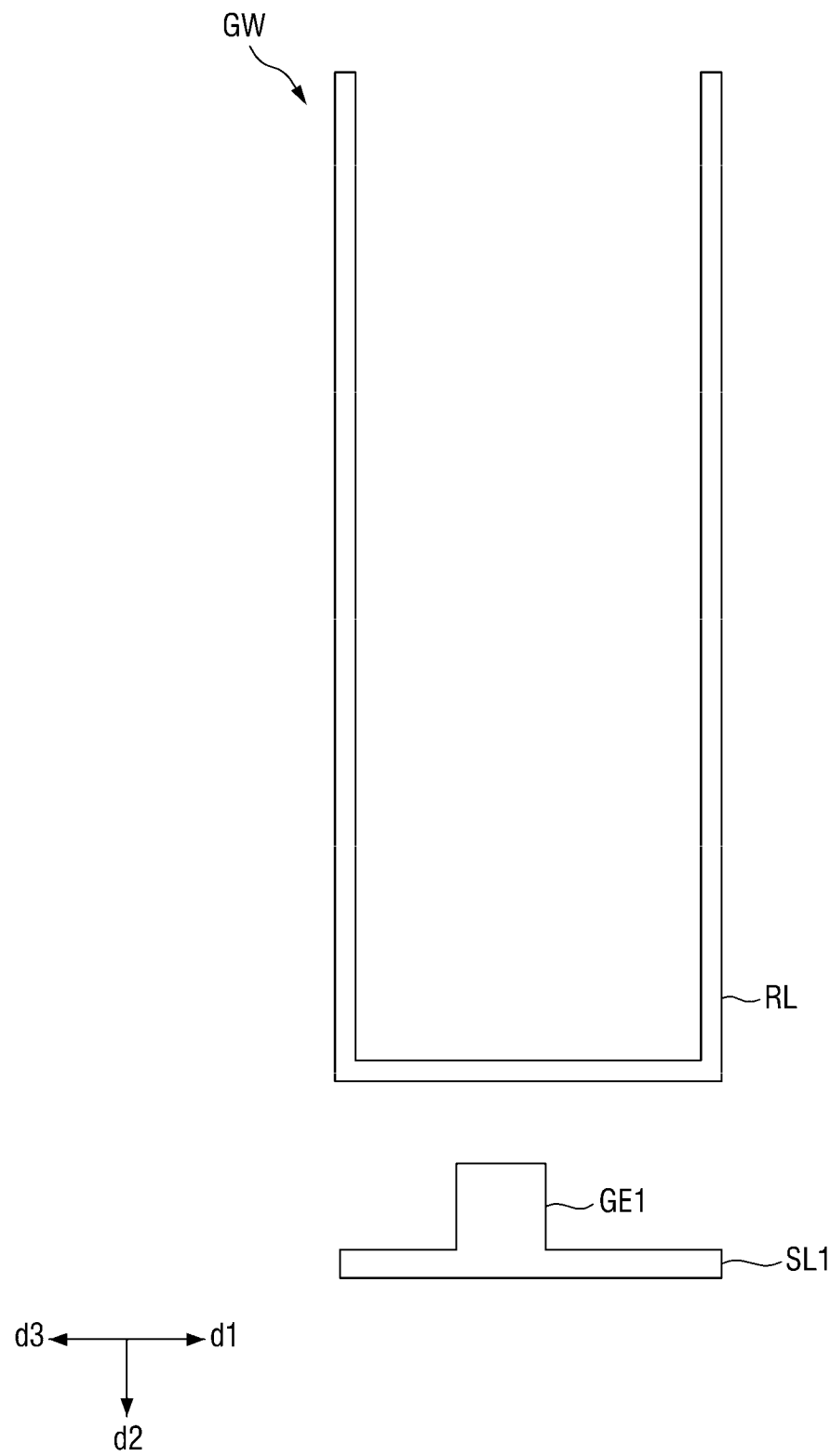
FIG. 5 illustrates a gate conductor included in the first pixel of FIG. 4.
Figure 6:
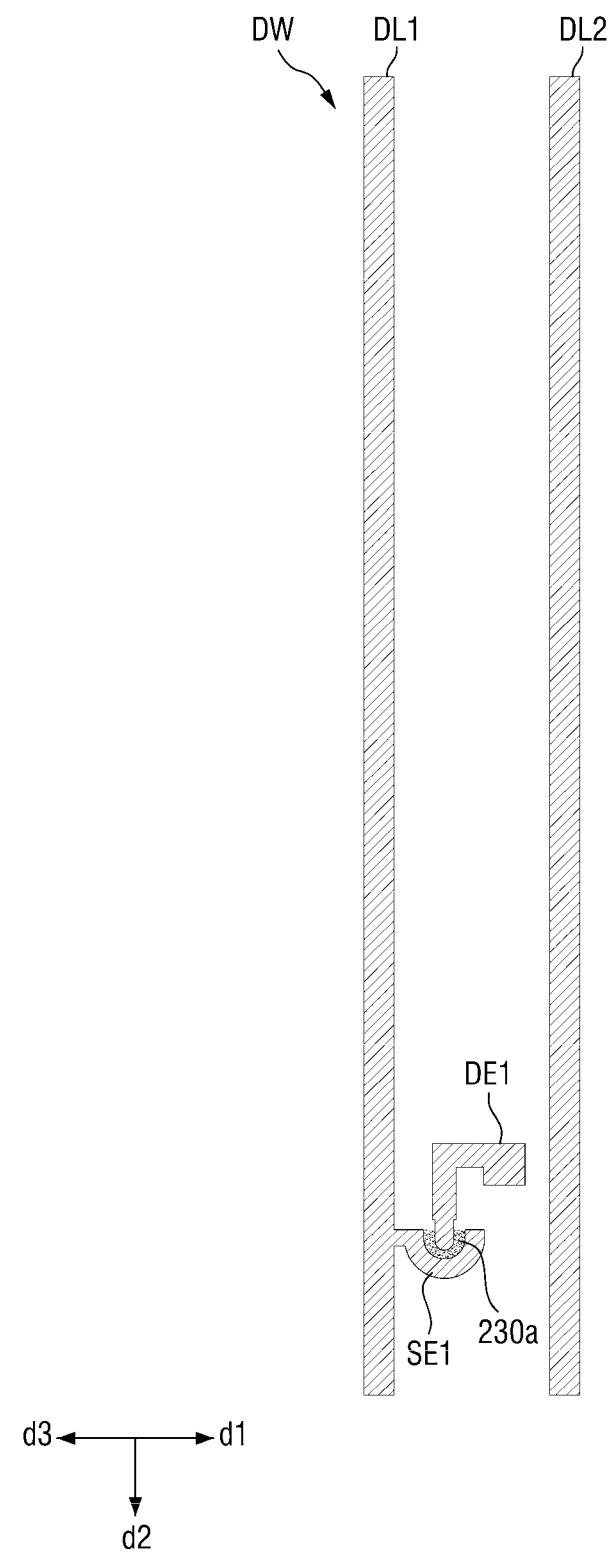
FIG. 6 illustrates a data conductor included in the first pixel of FIG. 4.
Figure 7:
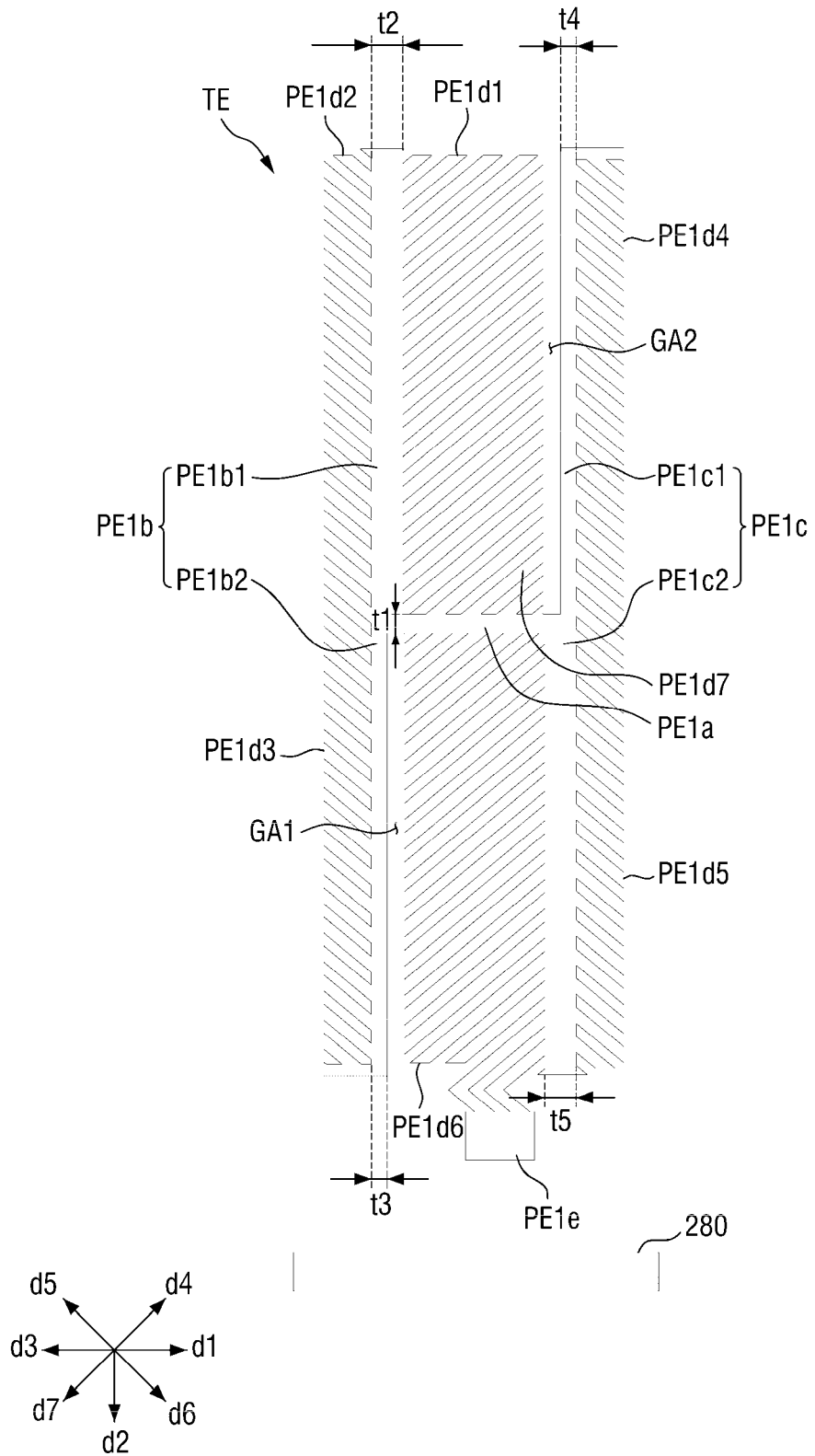
FIG. 7 illustrates a transparent conductor included in the first pixel of FIG. 4.
Figure 8:
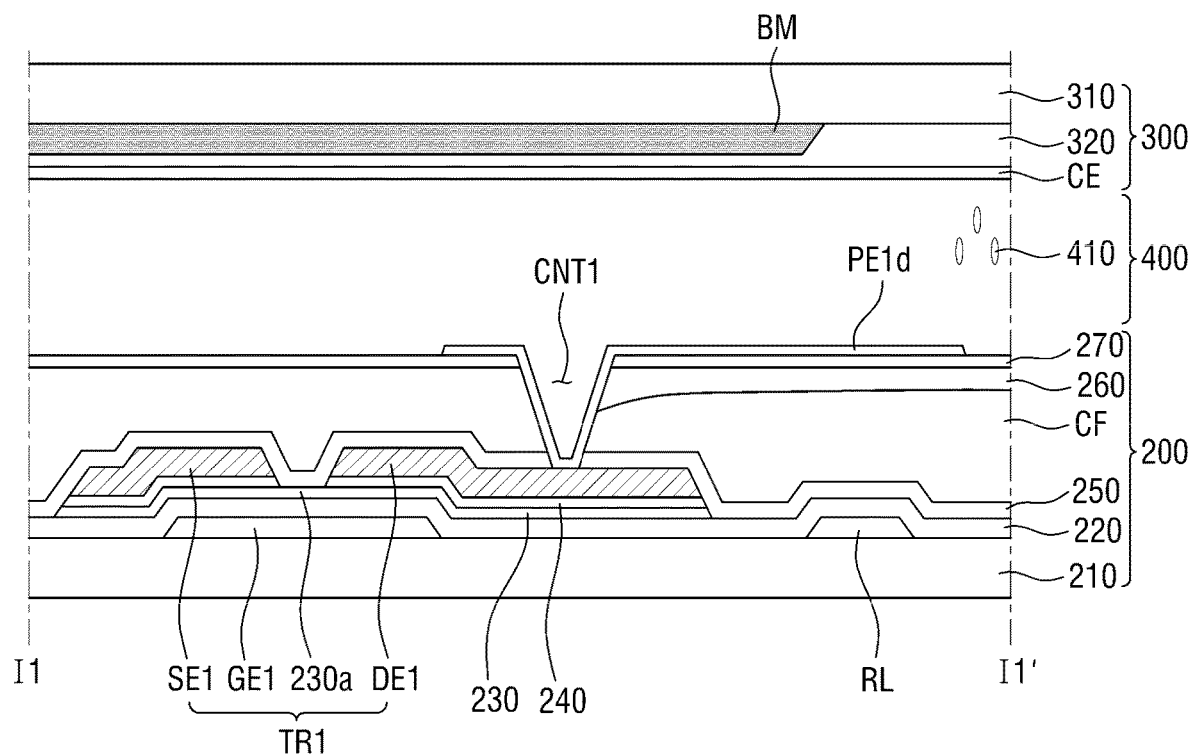
FIG. 8 is a cross-sectional view taken along line I1-I1' of FIG. 4.
Figure 9A:
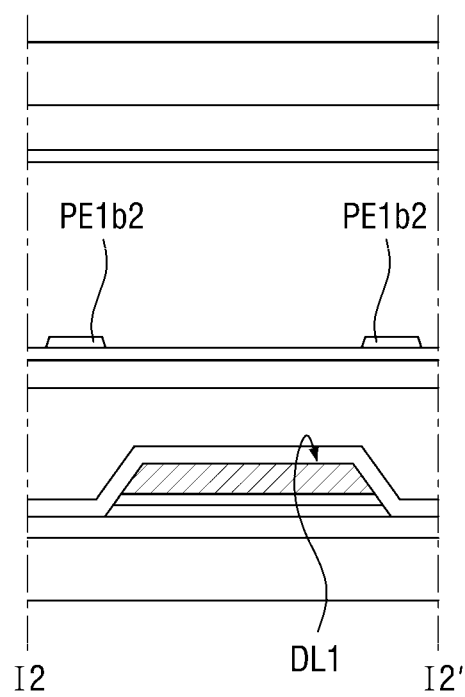
FIG. 9A and FIG. 9B are cross-sectional views taken along lines I2-I2' and I3-I3', respectively, of FIG. 4.
Figure 9B:
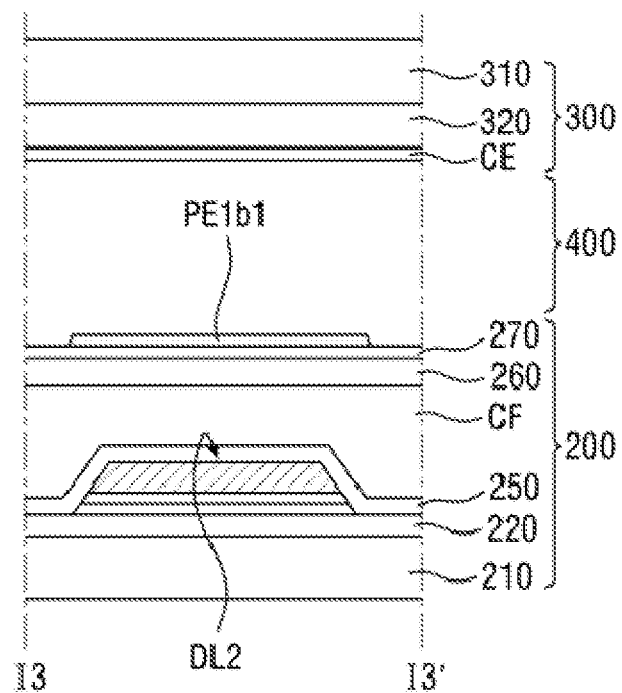

FIG. 5 illustrates a gate conductor GW included in the first pixel PX1 of FIG. 4. FIG. 6 illustrates a data conductor DW included in the first pixel PX1 of FIG. 4. FIG. 7 illustrates a transparent conductor TE included in the first pixel PX1 of FIG. 4. FIG. 8 is a cross-sectional view taken along line I1-I1' of FIG. 4. FIG. 9A and FIG. 9B are cross-sectional views taken along lines I2-I2' and I3-I3', respectively, of FIG. 4.

A first display panel 200 is arranged to face a second display panel 300. A liquid crystal layer 400 is interposed between the first display panel 200 and the second display panel 300. The liquid crystal layer 400 may include a plurality of liquid crystal molecules 410. The first display panel 200 may be bonded to the second display panel 300 by sealing.

The first display panel 200 will be described below.

A first substrate 210 may be a transparent insulating substrate in an exemplary embodiment. Here, the transparent insulating substrate may include a glass material, a quartz material, or a light-transmitting plastic material. In an exemplary embodiment, the first substrate 210 may be a flexible substrate or a stack of a plurality of films.

The gate conductor GW may be disposed on the first substrate 210. The gate conductor GW may include a plurality of scan lines including the first scan line SL1, a plurality of gate electrodes including the first gate electrode GET, and the storage line RL.

The storage line RL may be disposed on the same layer as the first scan line SL1. The storage line RL may surround the first pixel electrode PE1 in an exemplary embodiment. However, the shape of the storage line RL is not limited to that illustrated in FIGS. 3 and 4.

The above-described first storage capacitor Cst1 may be formed in relation to the storage line RL and the first pixel electrode PE1. Unlike in the drawings, the storage line RL may overlap at least a part of the first pixel electrode PE1. When two elements "overlap" each is other, it means herein that the two elements overlap each other in a direction perpendicular to the first substrate 210, unless otherwise defined.

The gate conductor GW may be a single layer, a double layer or a triple layer made of one conductive metal, at least two conductive metals or three conductive metals selected from aluminum (Al), copper (Cu), molybdenum (Mo), chrome (Cr), titanium (Ti), tungsten (W), moly-tungsten (MoW), moly-titanium (MoTi), and copper/moly-titanium (Cu/MoTi). The elements of the gate conductor GW may be formed simultaneously by the same mask process.

A gate insulating layer 220 may be disposed on the gate conductor GW. The gate insulating layer 220 may be made of silicon nitride or silicon oxide in an exemplary embodiment. The gate insulating layer 220 may have a multilayer structure including at least two insulating layers having different physical properties.

The data conductor DW may be disposed on the gate insulating layer 220. The data conductor DW may include a plurality of data lines including the first data line DL1, a plurality of source electrodes including the first source electrode SE1, a plurality of drain electrodes including the first drain electrode DE1, and a semiconductor layer 230 having a first semiconductor pattern 230a.

The semiconductor layer 230 may be disposed on the gate insulating layer 220. The semiconductor layer 230 may be made of amorphous silicon or polycrystalline silicon in an embodiment. In an exemplary embodiment, the semiconductor layer 230 may include an oxide semiconductor. In this case, the semiconductor layer 230 may be made of one of oxide semiconductors including In—Ga-Zinc-Oxide (IGZO), ZnO, $ZnO_2$, CdO, SrO, $SrO_2$, CaO, $CaO_2$, MgO, $MgO_2$, InO, $In_2O_2$, GaO, $Ga_2O$, $Ga_2O_3$, SnO, $SnO_2$, GeO, $GeO_2$, PbO, $Pb_2O_3$, $Pb_3O_4$, TiO, $TiO_2$, $Ti_2O_3$, and $Ti_3O_5$.

The first semiconductor pattern 230a of the semiconductor layer 230 may form a channel region of the first switching element TR1.

The data conductor DW may further include an ohmic contact layer 240. The ohmic contact layer 240 may be disposed on the semiconductor layer 230. The ohmic contact layer 240 may be made of a material such as n+ hydrogenated amorphous silicon heavily doped with an n-type impurity such as phosphorous or may be made of silicide. When the semiconductor layer 230 is made of an oxide semiconductor, the ohmic contact layer 240 may be omitted. In this specification, a case where the ohmic contact layer 240 is provided will be described.

The first data line DL1, the first source electrode SE1, and the first drain electrode DE1 may be disposed on the gate insulating layer 220 and the ohmic contact layer 240. The first source electrode SE1 may branch from the first data line DL1, and at least a part of the first source electrode SE1 may overlap the first gate electrode GE1. The first drain electrode DE1 may overlap the first gate electrode GE1 and may be spaced apart from the first source electrode SE1 by a predetermined distance.

In the drawings, the first source electrode SE1 is U-shaped, and the first drain electrode DEI is surrounded by the first source electrode SE1. However, the arrangement of the first source electrode SE1 and the first drain electrode DE1 is not limited to this example. The first source electrode SE1 the first drain electrode DE1, the first semiconductor pattern 230a and the first gate electrode GE1 form the first switching element TR1 described above.

The data conductor DW may be a single layer, a double layer or a triple layer made of one conductive metal, at least two conductive metals or three conductive metals selected from aluminum (Al), copper (Cu), molybdenum (Mo), chrome (Cr), titanium (Ti), tungsten (W), moly-tungsten (MoW), moly-titanium (MoTi), and copper/moly-titanium (Cu/MoTi). However, the material that forms the data conductor DW is not limited to the above examples, and the data conductor DW can be made of various metals or conductors. In an exemplary embodiment, the elements of the data conductor DW may be formed simultaneously by the same mask process.

A first passivation layer 250 may be disposed on the data conductor DW. The first passivation layer 250 includes an opening exposing at least a part of the first drain electrode DE1. The first passivation layer 250 may be made of an inorganic insulating material such as silicon nitride or silicon oxide in an exemplary embodiment. The first passivation layer 250 may prevent a pigment of an organic insulating layer 260, which will be described later, from flowing into the first semiconductor pattern 230a.

A color filter CF may be disposed on the first passivation layer 250. Light that passes through the color filter CF may display one of primary colors such as red, green and blue. However, the display color of light passing through the color filter CF is not limited to a primary color and may be any one of cyan, magenta, yellow, and white colors. The color filter CF may be made of a material that displays different colors in adjacent pixels. Unlike in the drawings, the color filter CF can be disposed on the second display panel 300.

The organic insulating layer 260 may be disposed on the first passivation layer 250 and the color filter CF. The organic insulating layer 260 may overlap the opening of the first passivation layer 250 and include an opening exposing at least a part of the first drain electrode DE1. The organic insulating layer 260 may include an organic material having excellent planarization characteristics and photosensitivity. The organic insulating layer 260 can be omitted.

A second passivation layer 270 may be disposed on the organic insulating layer 260. The second passivation layer 270 may be made of an inorganic insulating material such as silicon nitride or silicon oxide in an exemplary embodiment. The second passivation layer 270 can be omitted.

The opening of the first passivation layer 250, the opening of the organic insulating layer 260, and the opening of the second passivation layer 270 may form the first contact hole CNT1.

The transparent conductor TE may be disposed on the second passivation layer 270. The transparent conductor TE may include a transparent conductive material. Here, the transparent conductive material may include polycrystalline, monocrystalline, or amorphous indium tin oxide (ITO). The transparent conductor TE may include a plurality of pixel electrodes, including the first pixel electrode PE1 and a shielding electrode 280. In an embodiment, the first pixel electrode PE1 may be formed at the same time as the shielding electrode 280 by the same mask process. The first pixel electrode PE1 and the shielding electrode 280 are disposed on the same layer, but are physically and electrically insulated from each other.

The shielding electrode 280 may extend generally along the first direction d1. In an exemplary embodiment, the shielding electrode 280 may overlap a plurality of scan lines including the first scan line SL1 and the second scan line SL2. In an embodiment, a voltage provided to the shielding electrode 280 may be equal in voltage level to the common voltage Vcom (see FIG. 2) provided to the common electrode CE. In an exemplary embodiment, the common voltage Vcom may be provided directly to the shielding electrode 280.

The shielding electrode 280 is not disposed between pixel electrodes adjacent in the first direction d1. That is, the shielding electrode 280 is not disposed between the first pixel electrode PE1 and the third pixel electrode PE3. Accordingly, a distance p1 (see FIG. 10) between the first pixel electrode PE1 and the third pixel electrode PE3 can be reduced. This will be described later with reference to FIG. 10.

The first pixel electrode PE1 may directly contact the first drain electrode DE1 exposed through the first contact hole CNT1. In addition, the first pixel electrode PE1 overlaps the common electrode CE. Accordingly, the first liquid crystal capacitor Clc1 (see FIG. 2) may be formed between the first pixel electrode PE1 and the common electrode CE overlapping each other.

With reference to FIG. 7, the shape of a pixel electrode will now be described in more detail based on the first pixel electrode PE1.

First, stem portions of the first pixel electrode PE1 will be described.

The first pixel electrode PE1 may include a first stem portion PE1a extending in the first direction d1, a second stem portion PE1b extending in the second direction d2, and a third stem portion PE1c extending in the second direction d2 and spaced apart from the second stem portion PE1b. That is, the first stem portion PE1a is a horizontal stem portion extending in a horizontal direction based on FIG. 7, and the second stem portion PE1b and the third stem portion PE1c are vertical stem portions extending in a vertical direction.

The first stem portion PE1a, the second stem portion PE1b, and the third stem portion PE1c are physically and electrically connected to each other. More specifically, the second stem portion PE1b is connected to a side of the first stem portion PE1a, and the third stem portion PE1c is connected to the other side of the first stem portion PE1a.

The second stem portion PE1b may include a first sub-stem portion PE1b1 and a second sub-stem portion PE1b2 having different widths from each other. The third stem portion PE1c may include a third sub-stem portion PE1c1 and a fourth sub-stem portion PE1c2 having different widths from each other.

A width t2 of the first sub-stem portion PE1b1 is greater than a width t3 of the second sub-stem portion PE1b2. In an exemplary embodiment, the width t3 of the second sub-stem portion PE1b2 may be equal to or less than half of the width t2 of the first sub-stem portion PE1b1. A width t1 of the first stem portion PE1a may be greater than the width t3 of the second sub-stem portion PE1b2 and may be less than the width t2 of the first sub-stem portion PE1b1. In an exemplary embodiment, the width t1 of the first stem portion PE1a may be about 4 μm. In addition, the width t2 of the first sub-stem portion PE1b1 may be about 7 μm in an exemplary embodiment, and the width t3 of the second sub-stem portion PE1b2 may be about 2.5 μm in an exemplary embodiment.

A width t4 of the third sub-stem portion PE1c1 is less than a width t5 of the fourth sub-stem portion PE1c2. Accordingly, the first sub-stem portion PE1b1 and the fourth sub-stem portion PE1c2 may be symmetrical with each other with respect to the first stem portion PE1a. In addition, the second sub-stem portion PE1b2 and the third sub-stem portion PE1c1 may be symmetrical with each other with respect to the first stem portion PE1a.

The width t4 of the third sub-stem portion PE1c1 may be less than half of the width t5 of the fourth sub-stem portion PE1c2 in an exemplary embodiment. The width t4 of the third sub-stem portion PE1c1 may be substantially equal to the width t3 of the second sub-stem portion PE1b2. In addition, the width t5 of the fourth sub-stem portion PE1c2 may be substantially equal to the width t2 of the first sub-stem portion PE1b1. Therefore, the width t4 of the third sub-stem portion PE1c1 may be about 2.5 µm in an exemplary embodiment, and the width t5 of the fourth sub-stem portion PE1c2 may be about 7 µm in an exemplary embodiment.

Next, branch portions of the first pixel electrode PE1 will be described.

The first pixel electrode PE1 may further include a plurality of first branch portions PE1d1, a plurality of second branch portions PE1d2, a plurality of third branch portions PE1d3, a plurality of fourth branch portions PE1d4, a plurality of fifth branch portions PE1d5, a plurality of sixth branch portions PE1d6, and a plurality of seventh branch portions PE1d7.

The first branch portions PE1d1 are defined as branch portions extending from a side of the first sub-stem portion PE1b1 along a fourth direction d4. The second branch portions PE1d2 are defined as branch portions extending from the other side of the first sub-stem portion PE1b1 along a fifth direction d5. The first branch portions PE1d1 are generally longer than the second branch portions PE1d2.

The third branch portions PE1d3 are defined as branch portions extending from the second sub-stem portion PE1b2 along the fifth direction d5. The fourth branch portions PE1d4 are defined as branch portions extending from the third sub-stem portion PE1c1 along a sixth direction d6.

The fifth branch portions PE1d5 are defined as branch portions extending from a side of the fourth sub-stem portion PE1c2 along the sixth direction d6. The sixth branch portions PE1d6 are defined as branch portions extending from the other side of the fourth sub-stem portion PE1c2 along a seventh direction d7. The fifth branch portions PE1d5 are generally shorter than the sixth branch portions PE1d6.

The seventh branch portions PE1b7 are defined as branch portions extending from the first stem portion PE1a in the fourth direction d4 and the seventh direction d7.

The first pixel electrode PE1 does not include branch portions extending from the second sub-stem portion PE1b2 along the fourth direction d4. Also, the first pixel electrode PE1 does not include branch portions extending from the second sub-stem portion PE1b2 along the seventh direction d7. Accordingly, a first space GA1 is disposed between the second sub-stem portion PE1b2 and the sixth branch portions PE1d6. In addition, a second space GA2 is disposed between the third sub-stem portion PE1c1 and the first branch portions PE1d1.

The first data line DL1 may overlap the second stem portion PE1b of the first pixel electrode PE1. In addition, the first data line DL1 may overlap the first space GA1 described above. The second data line DL2 may overlap the third stem portion PE1c of the first pixel electrode PE1. In addition, the second data line DL2 may overlap the second space GA2 described above.

That is, by arranging the first data line DL1 and the second data line DL2 to coincide with disclination lines, a dark area formed by the first data line DL1 and the second data line DL2 can be minimized. Also, the minimized dark area can improve an aperture ratio of the LCD according to this exemplary embodiment.

A shortest distance l1 between the first data line DL1 and the storage line RL may be substantially equal to a shortest distance l2 between the second data line DL2 and the storage line RL. Thus, the LCD according to this exemplary embodiment may have uniform lateral visibility.

The first pixel electrode PE1 may further include a connection portion PE1e. In an exemplary embodiment, the connection portion PE1e may extend from at least one of the sixth branch portions PE1d6, and at least a part of the connection portion PE1e may overlap the first drain electrode DE1 of the first switching element TR1. The first contact hole CNT1 may be formed in an area where the connection portion PE1e overlaps the first drain electrode DE1. Although the connection portion PE1e extends from some of the sixth branch portions PE1d6 in the drawings, the inventive concepts are not limited to this case.

Referring again to FIGS. 3 through 9B, a first alignment layer (not illustrated) may be disposed on the transparent conductor TE. The first alignment layer may induce the initial alignment of a plurality of liquid crystal molecules in the liquid crystal layer 400. The first alignment layer may include a polymer organic material having an imide group in a repeating unit of a main chain in an exemplary embodiment.

Next, the second display panel 300 will be described.

A second substrate 310 is arranged to face the first substrate 210. The second substrate 310 may be made of transparent glass or plastic. In an exemplary embodiment, the second substrate 310 may be made of the same material as the first substrate 210.

A black matrix BM may be disposed on the second substrate 310. The black matrix BM may overlap an area excluding a pixel area for displaying an image, that is, may overlap a non-pixel area. The black matrix BM may prevent transmission of light through the non-pixel area. The material of the black matrix BM is not particularly limited as long as it can block light. The black matrix BM may be made of a photosensitive composition, an organic material, or a metallic material in an exemplary embodiment. The photosensitive composition, in an exemplary embodiment, may include a binder resin, a polymerizable monomer, a polymerizable oligomer, a pigment, and a dispersant. The metallic material may include chromium.

A planarization layer 320 may be disposed on the black matrix BM. The planarization layer 320 may provide flatness to the common electrode CE. The material of the planarization layer 320 is not particularly limited. In an exemplary embodiment, the planarization layer 320 may include an organic material or an inorganic material.

The common electrode CE may be disposed on the planarization layer 320. At least a part of the common electrode CE may overlap the first pixel electrode PE1. The common electrode CE may be formed in the form of a whole plate in an exemplary embodiment. Alternatively, the common electrode CE may include a plurality of slit portions. In an embodiment, the common electrode CE may be made of a transparent conductive material such as ITO or IZO or a reflective metal such as aluminum, silver, chromium or an alloy of these metals.

Although not illustrated in the drawings, a second alignment layer may be disposed on the common electrode CE. The second alignment layer may induce the initial alignment of a plurality of liquid crystal molecules in the liquid crystal layer 400. The second alignment layer may be made of the same material as the first alignment layer in an exemplary embodiment.

Next, the liquid crystal layer 400 will be described.

The liquid crystal layer 400 includes a plurality of liquid crystal molecules 410. The liquid crystal molecules 410 may have negative dielectric anisotropy and may be vertically aligned in an initial alignment state. The liquid crystal molecules 410 may have a predetermined pretilt angle in the initial alignment state. The initial alignment of the liquid crystal molecules 410 may be induced by the first and second alignment layers described above. When an electric field is formed between the first display panel 200 and the second display panel 300, the liquid crystal molecules 410 may tilt or rotate in a specific direction, thereby changing the polarization state of light transmitted through the liquid crystal layer 400.

Domains of the first pixel electrode PE1 and liquid crystal control in the first pixel electrode PE1 will now be described in more detail with reference to FIGS. 10 through 13.

Figure 10:
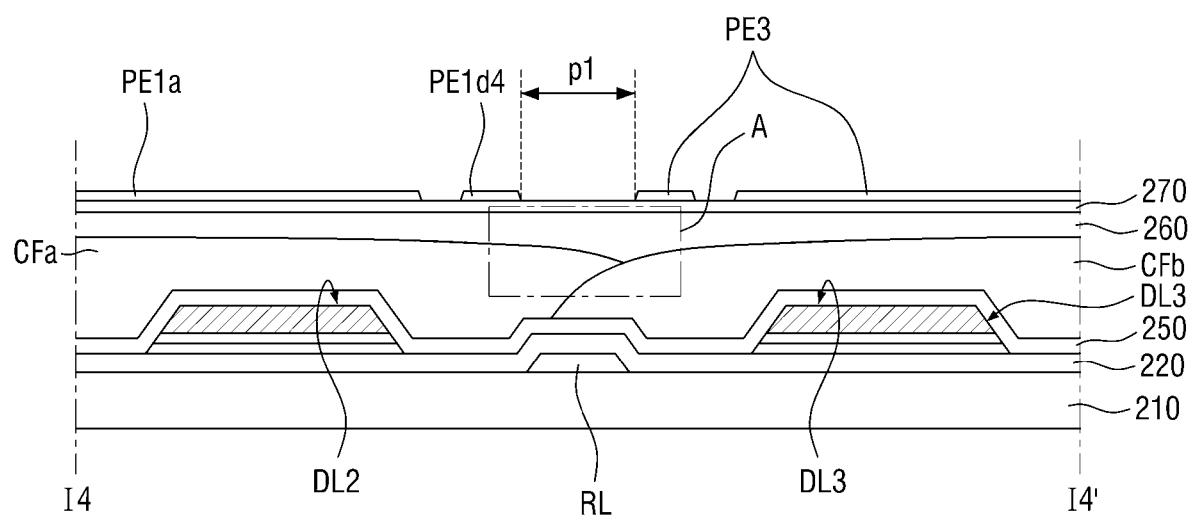
FIG. 10 is a cross-sectional view taken along line I4-I4' of FIG. 3.
Figure 11:
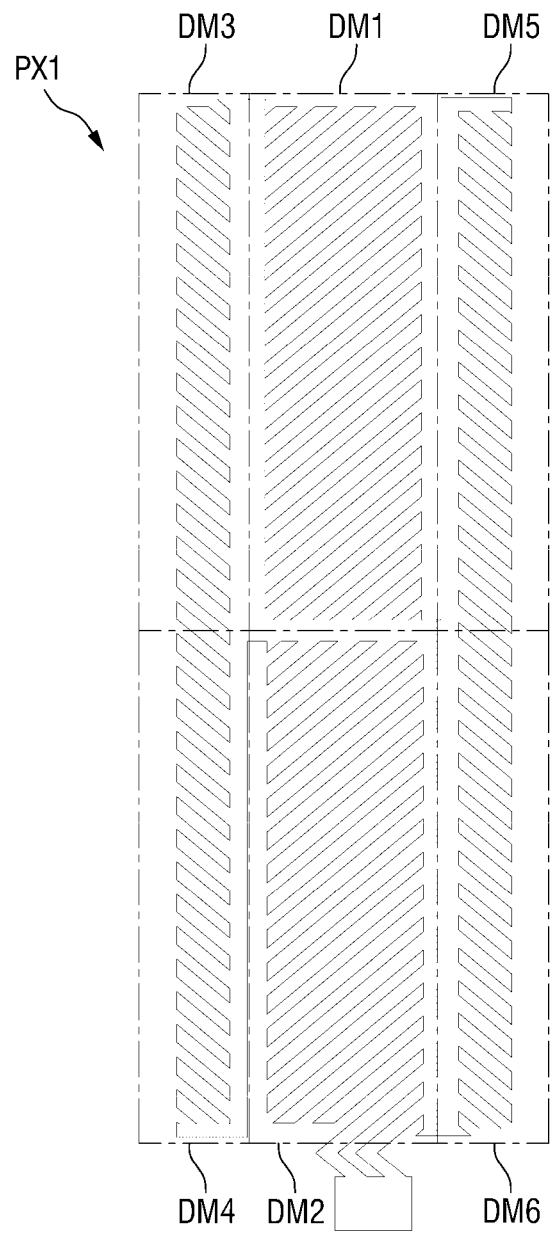
FIG. 11 illustrates domains of a first pixel electrode illustrated in FIG. 4.
Figure 11:
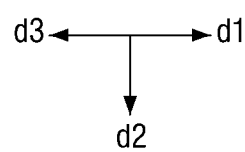
Figure 12:
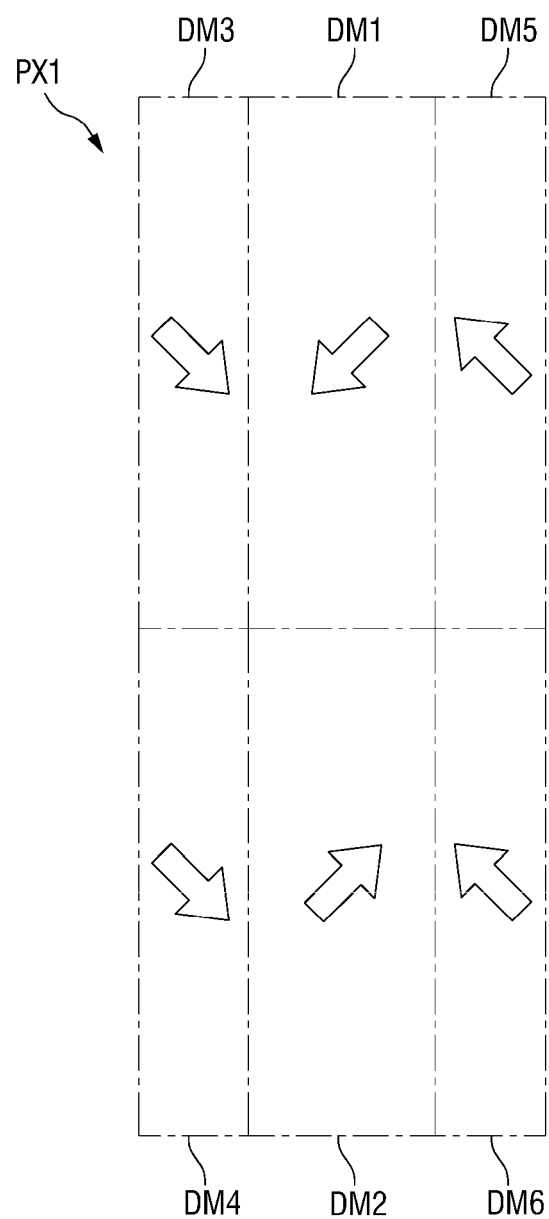
FIG. 12 and FIG. 13 are schematic views illustrating tilt directions of a plurality of liquid crystal molecules in the first pixel electrode of FIG. 4.
Figure 13:
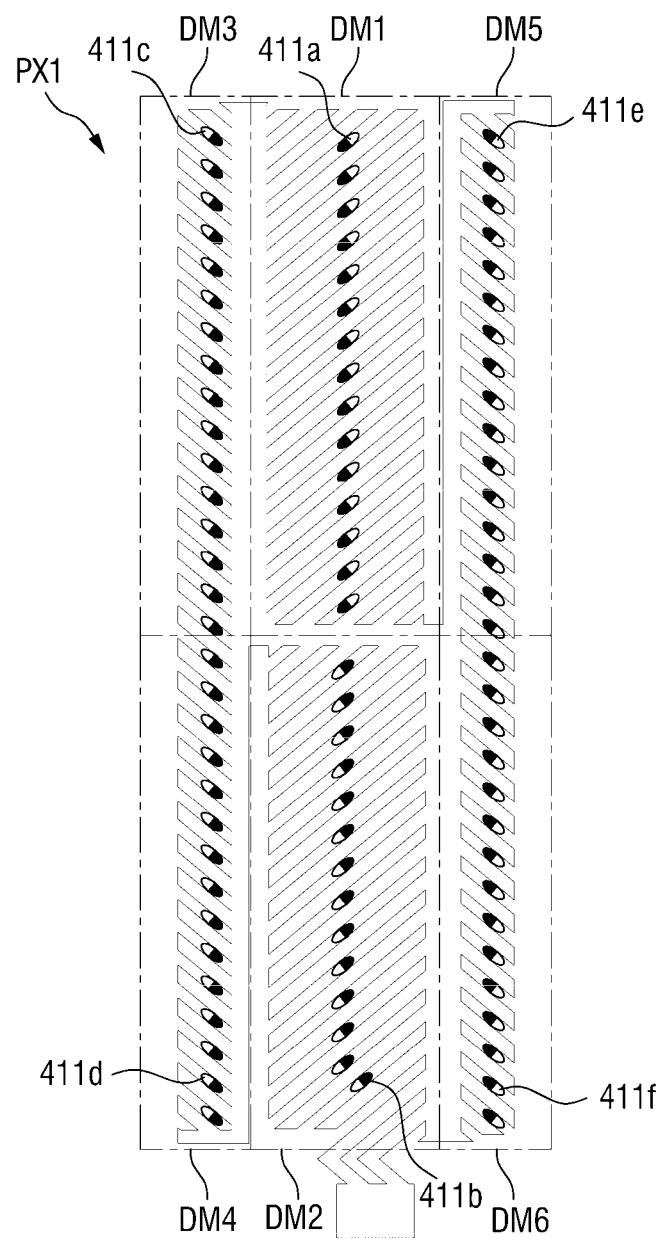
Figure 13:
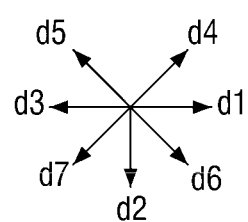

FIG. 10 is a cross-sectional view taken along line I4-I4' of FIG. 3. FIG. 11 illustrates domains of the first pixel electrode PE1 illustrated in FIG. 4. FIGS. 12 and 13 are schematic views illustrating tilt directions of a plurality of liquid crystal molecules in the first pixel electrode PE1 of FIG. 4. For ease of description, a color filter overlapping the first pixel electrode PE1 will hereinafter be referred to as a first color filter CFa, and a color filter overlapping the third pixel electrode PE3 will hereinafter be referred to as a second color filter CFb. Here, display colors of light transmitted through the first color filter CFa and the second color filter CFb may be different from each other.

First, the domains of the first pixel electrode PE1 will be described.

The first pixel electrode PE1 may include first through sixth domains DM1 through DM6 in an exemplary embodiment.

The first domain DM1 may have substantially the same area as the second domain DM2 in an exemplary embodiment. In addition, the first domain DM1 may have a larger area than the third through sixth domains DM3 through DM6. More specifically, the area of the first domain DM1 may be equal to the sum of the respective areas of the third domain DM3 and the fifth domain DM5. In addition, the area of the second domain DM2 may be equal to the sum of the respective areas of the fourth domain DM4 and the sixth domain DM6.

Accordingly, the sum of the areas of the first domain DM1 and the second domain DM2 may be equal to the sum of the areas of the third through sixth domains DM3 through DM6.

The first pixel electrode PE1 has different shapes in at least some of the first through sixth domains DM1 through DM6 described above. Accordingly, the liquid crystal molecules 410 may tilt in different directions in the first through sixth domains DM1 through DM6.

The direction in which liquid crystal molecules tilt in each domain in response to the formation of an electric field will now be described with reference to FIGS. 12 and 13. In the case of liquid crystal molecules illustrated in FIG. 13, dark portions correspond to head portions of the liquid crystal molecules. In addition, the control of the tilt direction of the liquid crystal molecules may also be expressed as azimuthal control.

A plurality of liquid crystal molecules 411a disposed in the first domain DM1 may be controlled to tilt toward the seventh direction d7. A plurality of liquid crystal molecules 411b disposed in the second domain DM2 may be controlled to tilt toward the fourth direction d4. That is, the liquid crystal molecules 411a disposed in the first domain DM1 and the liquid crystal molecules 411b disposed in the second domain DM2 having the same area as the first domain DM1 may be controlled to tilt in directions symmetrical with each other.

A plurality of liquid crystal molecules 411c disposed in the third domain DM3 may be controlled to tilt toward the sixth direction d6. A plurality of liquid crystal molecules 411d disposed in the fourth domain DM4 may be controlled to tilt toward the fifth direction d5. In addition, a plurality of liquid crystal molecules 411e disposed in the fifth domain DM5 may be controlled to tilt toward the sixth direction d6. A plurality of liquid crystal molecules 411f disposed in the sixth domain DM6 may be controlled to tilt toward the fifth direction d5. That is, the liquid crystal molecules 411c and 411e disposed in the third domain DM3 and the fifth domain DM5 may be controlled to tilt in directions symmetrical to each other, and the liquid crystal molecules 411d and 411f disposed in the fourth domain DM4 and the sixth domain DM6 may be controlled to tilt in directions symmetrical with each other.

Consequently, a plurality of liquid crystal molecules disposed in the first through sixth domains DM1 through DM6 may be controlled to tilt in various directions, but the distribution of the liquid crystal molecules tilted in each direction may be the same in the first through sixth domains DM1 through DM6. Accordingly, the LCD according to the embodiment can prevent a texture phenomenon and can have uniform lateral visibility.

The tilt direction of a plurality of liquid crystal molecules disposed between the first pixel electrode PE1 and the third pixel electrode PE3 may be controlled by branch portions of each pixel electrode PE1 or PE3. Since the branch portions of each pixel electrode PE1 or PE3 extend in directions symmetrical with each other, the liquid crystal molecules may also be controlled to tilt toward relatively close branch portions. Therefore, even if a trench for controlling the liquid crystal molecules existing between the first pixel electrode PE1 and the third pixel electrode PE3 is not formed in the organic insulating layer 260, the LCD according to this exemplary embodiment can control the tilt direction of the liquid crystal molecules.

The shielding electrode 280 may generally extend along the first direction d1 to overlap a plurality of scan lines including the first scan line SL1 as described above. However, the shielding electrode 280 is not disposed between the first pixel electrode PE1 and the third pixel electrode PE3. If the shielding electrode 280 is disposed between the first pixel electrode PE1 and the third pixel electrode PE3, it should be insulated from the first pixel electrode PE1 and the third pixel electrode PE3. Therefore, the shielding electrode 280 should be separated from the first pixel electrode PE1 and the third pixel electrode PE3 by a predetermined distance or more. On the other hand, in the LCD according to this exemplary embodiment, since the shielding electrode 280 is not disposed between the first pixel electrode PE1 and the third pixel electrode PE3, the distance p1 between the first pixel electrode PE1 and the third pixel electrode PE3 can be reduced. Accordingly, the aperture ratio of the LCD according to exemplary embodiment can be improved.

Hereinafter, LCDs according to other exemplary embodiments will be described. In the following exemplary embodiments, a description of elements and features identical to those described above with reference to FIGS. 1 through 13 will be omitted, and the same elements as those of FIGS. 1 through 13 will be indicated by the same reference numerals.

Figure 14:
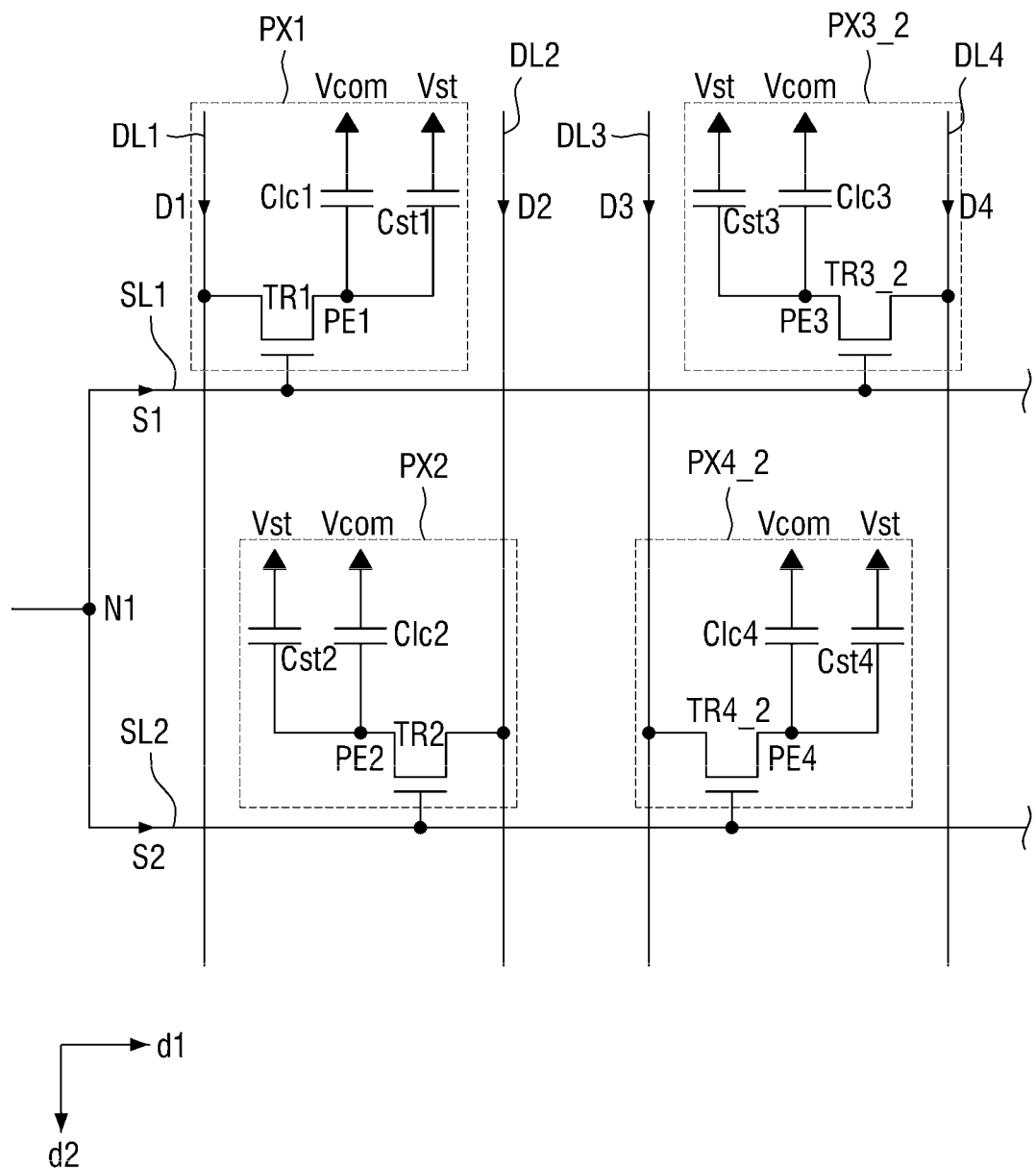
FIG. 14 is an equivalent circuit diagram of an LCD according to an exemplary embodiment.
Figure 15:
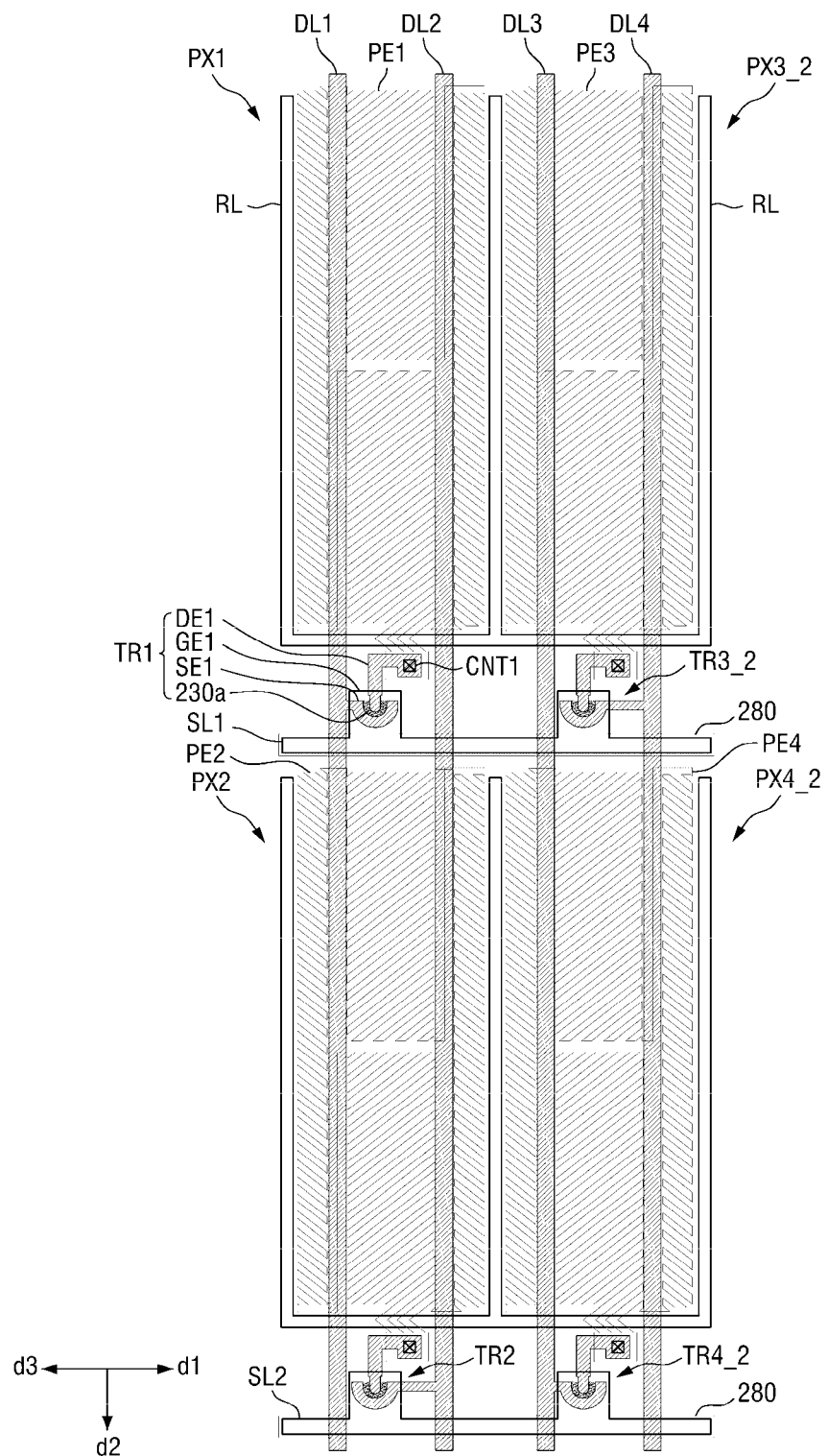
FIG. 15 is a detailed layout view of the LCD illustrated in FIG. 14.

FIG. 14 is an equivalent circuit diagram of an LCD according to an exemplary embodiment. FIG. 15 is a detailed layout view of the LCD illustrated in FIG. 14.

The LCD illustrated in FIGS. 14 and 15 is different from the LCD illustrated in FIGS. 2 and 3 in that a third switching element TR3_2 included in a third pixel PX3_2 is electrically connected to a fourth data line DL4 and a fourth switching element TR4_2 included in a fourth pixel PX4_2 is electrically connected to a third data line DL3.

That is, in the LCD illustrated in FIGS. 14 and 15, pixels in the same column are arranged alternately in a direction different from that in the LCD illustrated in FIGS. 2 and 3.

Figure 16:
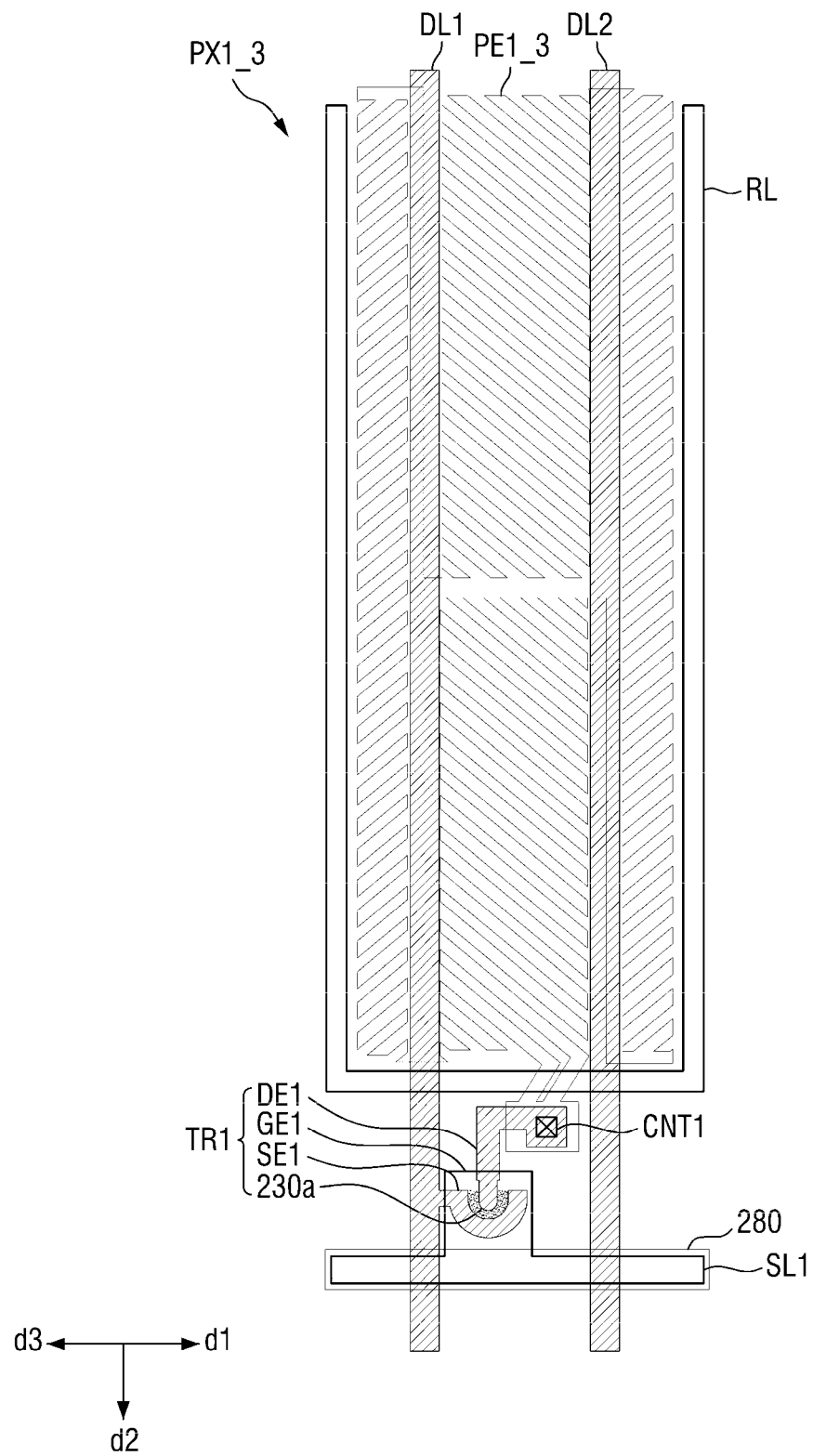
FIG. 16 is a layout view illustrating a first pixel among elements of an LCD according to an exemplary embodiment.

FIG. 16 is a layout view illustrating a first pixel PX1_3 among elements of an LCD according to an exemplary embodiment.

A first pixel electrode PE1_3 illustrated in FIG. 16 is different in shape from the first pixel electrode PE1 illustrated in FIG. 4. More specifically, the first pixel electrode PE1_3 illustrated in FIG. 16 may be symmetrical to the first pixel electrode PE1 illustrated in FIG. 4.

Pixel electrodes can have different shapes within an LCD. This will now be described in more detail with reference to FIG. 17.

Figure 17:
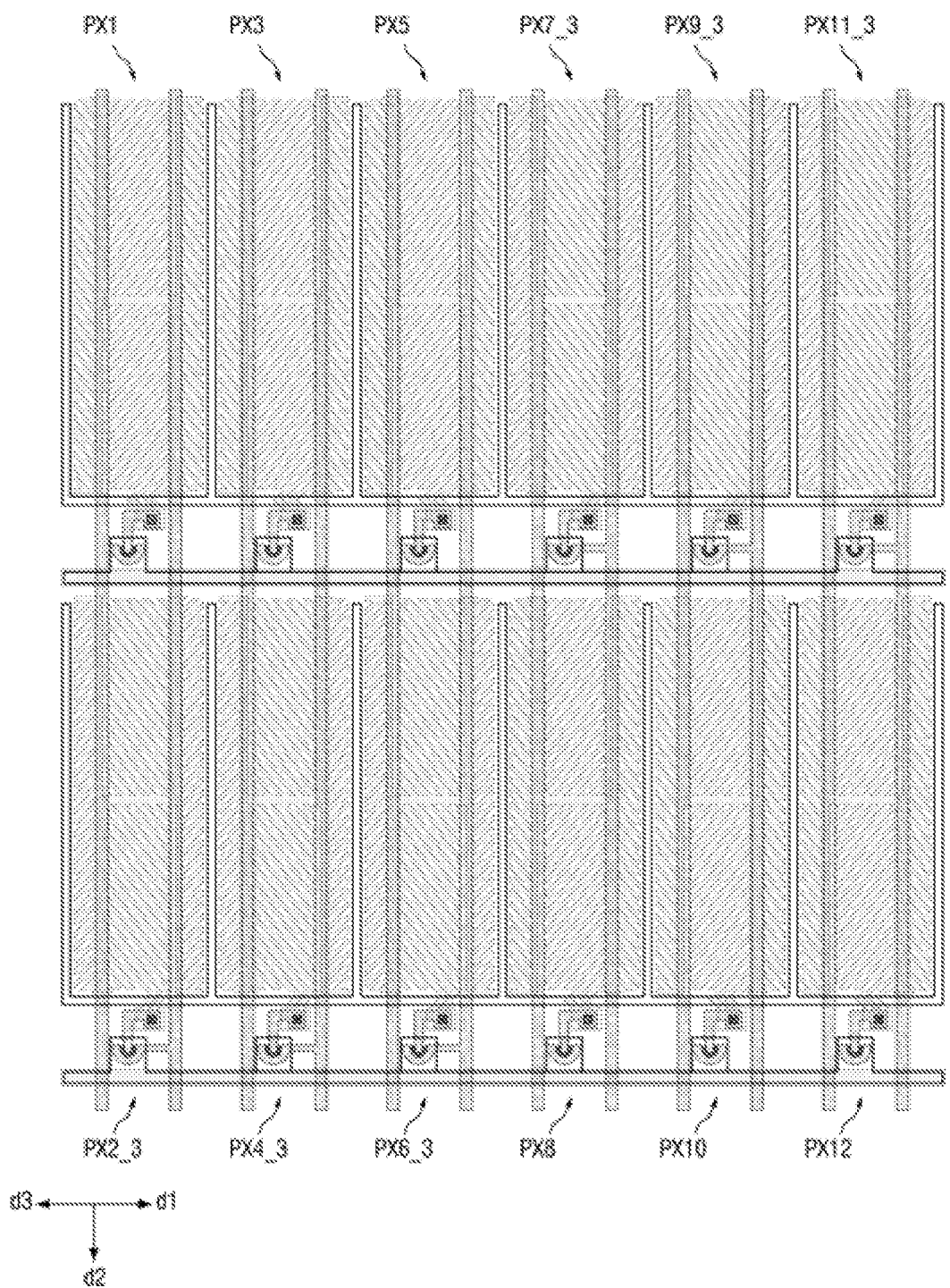
FIG. 17 is a layout view of an LCD according to an exemplary embodiment.

FIG. 17 is a layout view of an LCD according to an exemplary embodiment. For ease of description, "_3" will be added to a reference numeral indicating a pixel including a pixel electrode having the same shape as the first pixel electrode PE1_3 illustrated in FIG. 16.

Referring to FIG. 17, the shape of a pixel electrode and the connection relationship between a switching element and a data line are changed every three pixels.

Pixel electrodes respectively included in a first pixel PX1, a third pixel PX3, a fifth pixel PX5, an eighth pixel PX8, a tenth pixel PX10, and a twelfth pixel PX12 may have the same shape. In addition, pixel electrodes respectively included in a second pixel PX2_3, a fourth pixel PX4_3, a sixth pixel PX6_3, a seventh pixel PX7_3, a ninth pixel PX9_3, and an eleventh pixel PX11_3 may have the same shape.

In an exemplary embodiment, pixels arranged in the same row may sequentially display red, green and blue. In addition, pixels arranged in the same column may display the same color. That is, the shape of the pixel electrode and the connection relationship between the switching element and the data line may be changed every red (R), green (G) and blue (B) pixels in FIG. 17.

While the shape of the pixel electrode and the connection relationship between the switching element and the data line are changed every three pixels in FIG. 17, they can be changed every two pixels or every six pixels.

Figure 18:
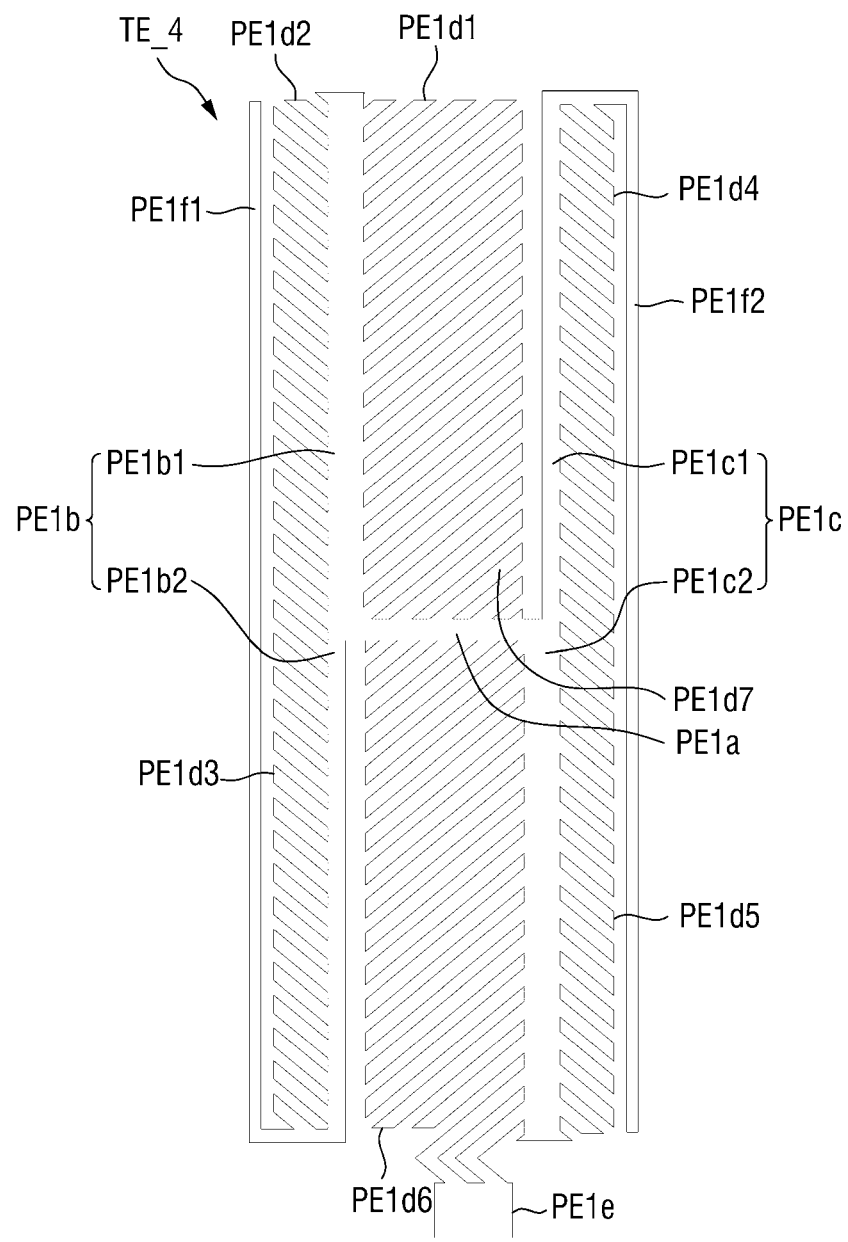
FIG. 18 illustrates a transparent conductor among elements of an LCD according to an exemplary embodiment.

FIG. 18 illustrates a transparent conductor TE_4 among elements of an LCD according to an exemplary embodiment.

The shape of a first pixel electrode PE1_4 of the transparent conductor TE_4 illustrated in FIG. 18 is different from that of the first pixel electrode PE1 illustrated in FIG. 4.

The first pixel electrode PE1_4 may further include a first edge bar PE1/1 and a second edge bar PE1/2.

The first edge bar PE1/1 and the second edge bar PE1/2 may extend in the second direction d2. The first edge bar PE1/1 may be connected to a second sub-stem portion PE1$b$2 of a second stem portion PE1$b$ and may be spaced apart from a plurality of second branch portions PE1$d$2 along a third direction d3. The second edge bar PE1/2 may be connected to a third sub-stem portion PE1$c$1 of a third stem portion PE1$c$ and may be spaced apart from a plurality of fourth branch portions PE1$d$4 in the first direction d1.

However, the connection relationship between each of the first edge bar PE1/1 and the second edge bar PE1/2 and a plurality of branch portions is not limited to that illustrated in FIG. 18. In an embodiment, the first edge bar PE1/1 may be directly connected to the second branch portions PE1$d$2, and the second edge bar PE1/2 may be directly connected to the fourth branch portions PE1$d$4.

That is, the LCD according to the embodiment can further improve lateral visibility by including a pixel electrode having edge bars.

Figure 19:
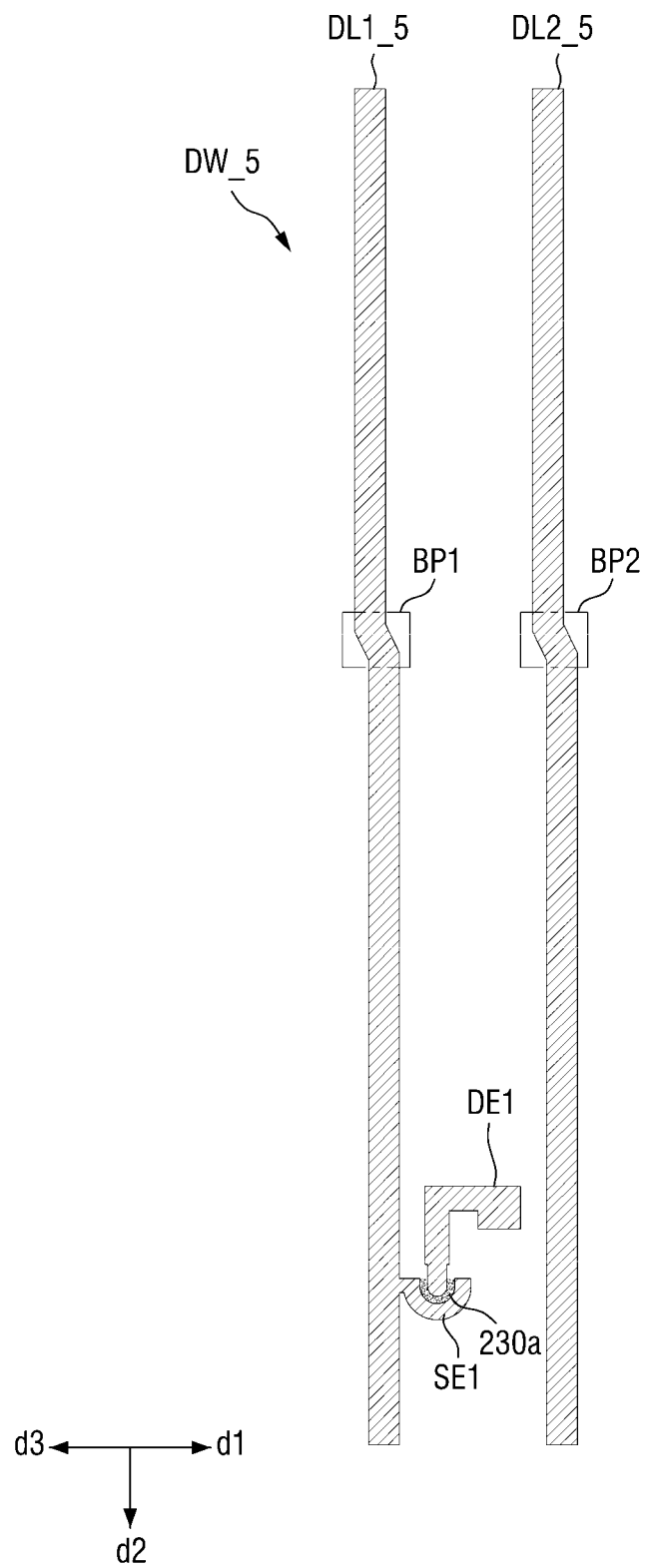
FIG. 19 illustrates a data conductor among elements of an LCD according to an exemplary embodiment.
Figure 20:
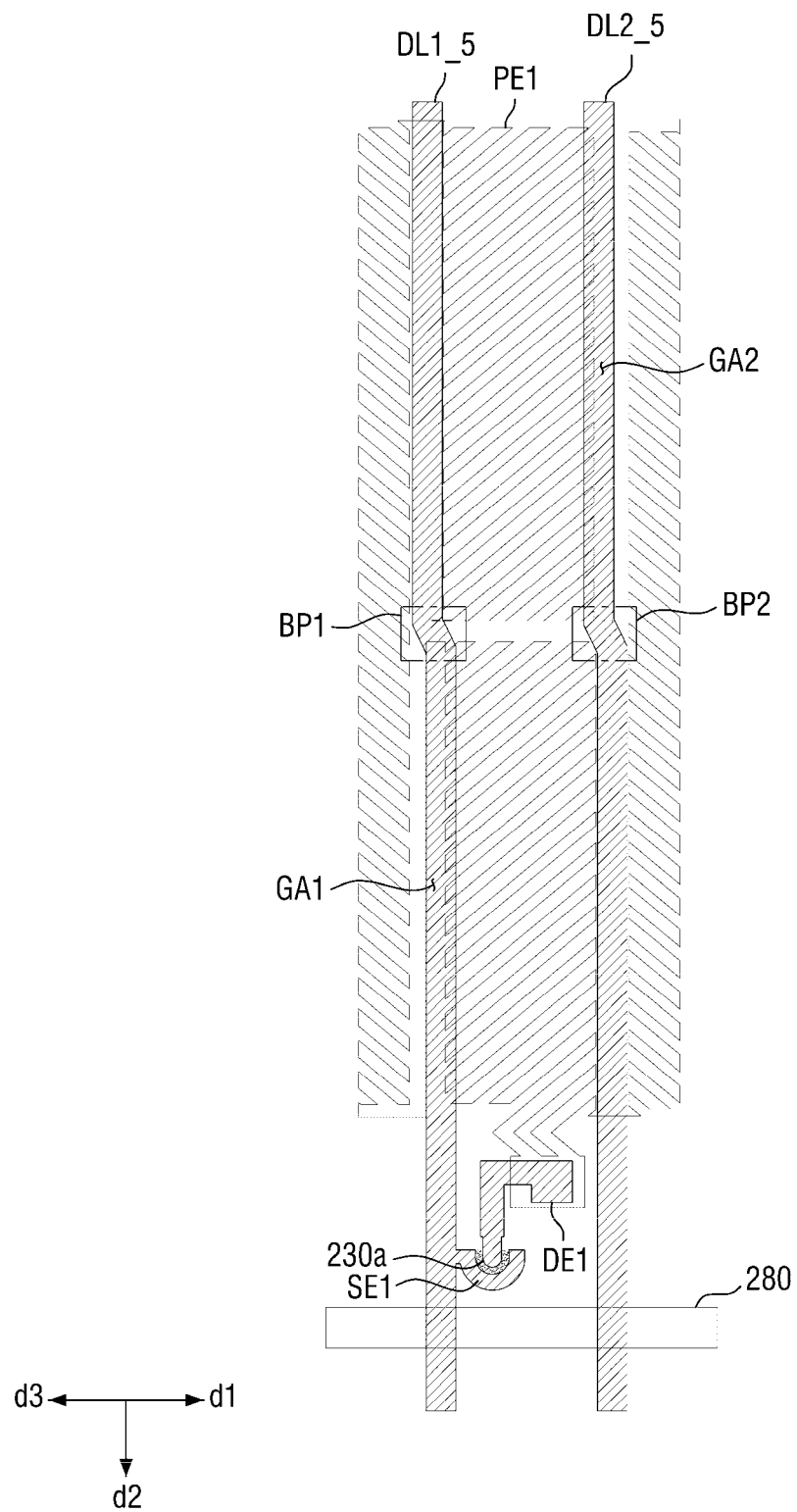
FIG. 20 illustrates the data conductor of FIG. 19 together with the transparent conductor of FIG. 7.

FIG. 19 illustrates a data conductor DW_5 among elements of an LCD according to an embodiment. FIG. 20 illustrates the data conductor DW_5 of FIG. 19 together with the transparent conductor TE of FIG. 7.

Referring to FIGS. 19 and 20, a first data line DL1_5 may include a first bent portion BP1, and a second data line DL2_5 may include a second bent portion BP2.

Both the first bent portion BP1 and the second bent portion BP2 overlap a first pixel electrode PE1. More specifically, the first data line DL1_5 may overlap a first sub-stem portion PE1$b$1 of a second stem portion PE1$b$, a first space GA1 between a second sub-stem portion PE1$b$2 and a plurality of sixth branch portions PE1$d$6, and at least part of the sixth branch portions PE1$d$6. The second data line DL2_5 may overlap a fourth sub-stem portion PE1$c$2 of a third stem portion PE1$c$, a second space GA2 between a third sub-stem portion PE1$c$1 and a plurality of first branch portions PE1$d$1, and at least part of the first branch portions PE1$d$1.

By forming the first data line DL1_5 and the second data line DL2_5 having the bent portions BP1 and BP2, even if misalignment occurs when the first data line DL1_5, the second data line DL2_5 and the first pixel electrode PE1 are formed, a reduction in aperture ratio can be minimized.

According to exemplary embodiments, it is possible to perform high-resolution driving while minimizing a reduction in aperture ratio.

In addition, it is possible to control a plurality of liquid crystal molecules disposed between adjacent pixel electrodes without a trench.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A liquid crystal display (LCD) comprising:
   a first pixel electrode comprising a first stem portion extending in a first direction, a second stem portion connected to a first side of the first stem portion and extending in a second direction different from the first direction, and a third stem portion connected to a second side of the first stem portion and extending in the second direction;
   a first data line extending in the second direction and overlapping the second stem portion of the first pixel electrode; and
   a second data line extending in the second direction and overlapping the third stem portion of the first pixel electrode, wherein:
the second stem portion comprises a first sub-stem portion and a second sub-stem portion having different widths, and the third stem portion comprises a third sub-stem portion and a fourth sub-stem portion having different widths; and
each of the first sub-stem portion, the second sub-stem portion, the third sub-stem portion, and the fourth sub-stem portion has a constant width.

2. The LCD of claim 1, wherein the width of the first sub-stem portion is greater than that of the second sub-stem portion, and the width of the third sub-stem portion is less than that of the fourth sub-stem portion.

3. The LCD of claim 1, wherein a width of the first stem portion is greater than the width of the second sub-stem portion and less than the width of the first sub-stem portion.

4. The LCD of claim 1, wherein:
the first pixel electrode further comprises a plurality of first branch portions extending from the first sub-stem portion and a plurality of second branch portions extending from the first sub-stem portion in a direction opposite to the first branch portions; and
the first branch portions are longer than the second branch portions.

5. The LCD of claim 4, wherein the second data line overlaps a space between the first branch portions and the third sub-stem portion.

6. The LCD of claim 1, wherein the first pixel electrode further comprises a plurality of branch portions extending from the fourth sub-stem portion toward the second sub-stem portion, and the first data line overlaps a space between the second sub-stem portion and the branch portions.

7. The LCD of claim 1, further comprising:
a first scan line extending in the first direction; and
a first switching element comprising a control electrode connected to the first scan line, a first electrode connected to the first data line, and a second electrode connected to the first pixel electrode.

8. The LCD of claim 7, further comprising:
a second pixel electrode disposed in the same column as the first pixel electrode;
a second scan line extending in the first direction; and
a second switching element comprising a control electrode connected to the second scan line, a first electrode connected to the second data line, and a second electrode connected to the second pixel electrode.

9. The LCD of claim 8, wherein the first scan line and the second scan line are electrically connected to each other.

10. The LCD of claim 7, further comprising a shielding electrode extending in the first direction and overlapping the first scan line, wherein the shielding electrode is disposed on the same layer as the first pixel electrode.

11. The LCD of claim 1, wherein each of the first data line and the second data line comprises a bent portion, and the bent portion of each of the first data line and the second data line overlaps the first pixel electrode.

12. A liquid crystal display (LCD) comprising:
a substrate;
a first scan line disposed on the substrate and extending in a first direction;
a first data line disposed on the first scan line and extending in a second direction different from the first direction;
a second data line disposed on the same layer as the first data line and extending in the second direction;
a first pixel electrode disposed on the first data line and the second data line and comprising:

a first stem portion extending in the first direction;
a second stem portion extending in the second direction and overlapping the first data line; and
a third stem portion extending in the second direction and overlapping the second data line; and
a first switching element comprising a control electrode connected to the first scan line, a first electrode connected to the first data line, and a second electrode connected to the first pixel electrode,
wherein:
the second stem portion comprises a first sub-stem portion and a second sub-stem portion having different widths, and the third stem portion comprises a third sub-stem portion and a fourth sub-stem portion having different widths; and
each of the first sub-stem portion, the second sub-stem portion, the third sub-stem portion, and the fourth sub-stem portion has a constant width.

13. The LCD of claim 12, wherein the width of the first sub-stem portion is greater than that of the second sub-stem portion, and the width of the third sub-stem portion is smaller than that of the fourth sub-stem portion.

14. The LCD of claim 13, further comprising:
a second pixel electrode disposed in the same column as the first pixel electrode;
a second scan line extending in the first direction and electrically connected to the first scan line; and
a second switching element comprising a control electrode connected to the second scan line, a first electrode connected to the second data line, and a second electrode connected to the second pixel electrode.

15. The LCD of claim 14, wherein:
the second pixel electrode comprises:
a first stem portion extending in the first direction;
a second stem portion extending in the second direction and overlapping the first data line; and
a third stem portion extending in the second direction and overlapping the second data line;
the second stem portion of the second pixel electrode comprises a first sub-stem portion and a second sub-stem portion having different widths;
the third stem portion of the second pixel electrode comprises a third sub-stem portion and a fourth sub-stem portion having different widths;
the width of the first sub-stem portion of the second pixel electrode is less than that of the second sub-stem portion of the second pixel electrode; and
the width of the third sub-stem portion of the second pixel electrode is greater than that of the fourth sub-stem portion of the second pixel electrode.

16. The LCD of claim 12, wherein:
the first pixel electrode further comprises a plurality of first branch portions extending from the first sub-stem portion and a plurality of second branch portions extending from the first sub-stem portion in a direction opposite to the first branch portions; and
the first branch portions are longer than the second branch portions.

17. The LCD of claim 16, wherein the second data line overlaps a space between the first branch portions and the third sub-stem portion.

18. The LCD of claim 12, wherein the first pixel electrode further comprises a plurality of branch portions extending from the fourth sub-stem portion toward the second sub-stem portion, and the first data line overlaps a space between the second sub-stem portion and the branch portions.

19. The LCD of claim 12, further comprising a storage line disposed on the same layer as the first scan line and surrounds the first pixel electrode, wherein a first shortest distance between the first data line and the storage line is equal to a second shortest distance between the second data line and the storage line.

20. The LCD of claim 12, wherein each of the first data line and the second data line comprises a bent portion, and the bent portion of each of the first data line and the second data line overlaps the first pixel electrode.

\* \* \* \* \*